United States Patent
Rochon et al.

(10) Patent No.: US 12,423,651 B2
(45) Date of Patent: *Sep. 23, 2025

(54) SYSTEM AND METHOD OF AUGMENTED VISUALIZATION OF PLANOGRAMS

(71) Applicant: Blue Yonder Group, Inc., Scottsdale, AZ (US)

(72) Inventors: Benoît Rochon, Montréal (CA); Marie-Claude Côté, Montréal (CA)

(73) Assignee: Blue Yonder Group, Inc., Scottsdale, AZ (US)

( * ) Notice: Subject to any disclaimer, the term of this patent is extended or adjusted under 35 U.S.C. 154(b) by 116 days.

This patent is subject to a terminal disclaimer.

(21) Appl. No.: 18/406,962

(22) Filed: Jan. 8, 2024

(65) Prior Publication Data
US 2024/0144178 A1     May 2, 2024

Related U.S. Application Data

(63) Continuation of application No. 18/096,934, filed on Jan. 13, 2023, now Pat. No. 11,915,194, which is a continuation of application No. 15/863,115, filed on Jan. 5, 2018, now Pat. No. 11,568,356.

(60) Provisional application No. 62/444,146, filed on Jan. 9, 2017.

(51) Int. Cl.
G06Q 10/087     (2023.01)
G06T 19/00      (2011.01)

(52) U.S. Cl.
CPC ......... *G06Q 10/087* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 7,921,036 B1 | 4/2011 | Sharma et al. | |
| 8,049,621 B1 | 11/2011 | Egan | |
| 8,531,447 B2 | 9/2013 | Walker et al. | |
| 9,189,021 B2 | 11/2015 | Jerauld | |
| 9,424,598 B1 | 8/2016 | Kraft | |
| 10,410,171 B2 | 9/2019 | Jones et al. | |
| 10,434,659 B2 | 10/2019 | Norton et al. | |
| 10,977,710 B2 | 4/2021 | Axelsson et al. | |
| 11,468,500 B2 | 10/2022 | Roesbery et al. | |
| 11,568,356 B1 * | 1/2023 | Rochon | G06T 11/00 |
| 11,915,194 B2 * | 2/2024 | Rochon | G06Q 10/087 |
| 2006/0116930 A1 * | 6/2006 | Goldstein | G06Q 30/02 |
| | | | 705/14.49 |
| 2008/0147475 A1 | 6/2008 | Gruttadauria | |
| 2014/0129328 A1 | 5/2014 | Mathew | |

(Continued)

*Primary Examiner* — Olabode Akintola
(74) *Attorney, Agent, or Firm* — Spencer Fane LLP; Steven J. Laureanti

(57) ABSTRACT

A system and method are disclosed for augmented visualization of a planogram of one or more supply chain entities. Embodiments include creating a planogram comprising one or more products, the products associated with a location, and retrieving an image of the planogram and one or more customer segments. Embodiments further include mapping one or more coordinates in an image of a planogram that correspond to the one or more customer segments and rendering an augmented visualization comprising altering the image of a planogram at one or more coordinates to illustrate the one or more customer segments.

20 Claims, 16 Drawing Sheets

(56) References Cited

U.S. PATENT DOCUMENTS

| | | |
|---|---|---|
| 2014/0195302 A1 | 7/2014 | Yopp et al. |
| 2014/0201040 A1 | 7/2014 | Birch |
| 2014/0214547 A1* | 7/2014 | Signorelli .......... G06Q 30/0267 |
| | | 705/14.64 |
| 2015/0088703 A1* | 3/2015 | Yan ...................... G06Q 10/087 |
| | | 705/28 |
| 2015/0262120 A1* | 9/2015 | Kulig ................. G06Q 30/0639 |
| | | 705/28 |
| 2015/0324725 A1* | 11/2015 | Roesbery ........... G06Q 30/0639 |
| | | 705/7.39 |
| 2018/0150791 A1 | 5/2018 | Stansell et al. |

\* cited by examiner

SYSTEM AND METHOD OF AUGMENTED VISUALIZATION OF PLANOGRAMS

CROSS-REFERENCE TO RELATED APPLICATIONS

This application is a continuation of U.S. patent application Ser. No. 18/096,934, filed Jan. 13, 2023, entitled "System and Method of Augmented Visualization of Planograms," which is a continuation of U.S. patent application Ser. No. 15/863,115, filed Jan. 5, 2018, entitled "System and Method of Augmented Visualization of Planograms," now U.S. Pat. No. 11,568,356, which claims the benefit under 35 U.S.C. § 119(e) to U.S. Provisional Application No. 62/444,146, filed Jan. 9, 2017, entitled "System and Method of Augmented Visualization of Planograms." U.S. patent application Ser. No. 18/096,934, U.S. Pat. No. 11,568,356, and U.S. Provisional Application No. 62/444,146 are assigned to the assignee of the present application.

TECHNICAL FIELD

The present disclosure relates generally to planogram planning and specifically to augmented visualization of planograms.

BACKGROUND

Grocery shelving may be quite visually chaotic with hundreds of multicolored products competing to catch a customer's eye. Typically, product packaging and shelf layouts are arranged to increase sale performance. Although this situation may be acceptable in most cases, other situations may require an alternative way of browsing the products on the shelf. For example, to deal with food allergies, many customers must avoid products containing certain ingredients. Often the only way to identify the ingredients in a packaged product is by reading the label on each individual product. Similarly, grocery employees must monitor and dispose of expired products. Ordinarily, the expiration date is printed on the product in an inconspicuous location, which requires the employee to handle and read each individual item to search for expired products. Traditional forms of product packaging and shelf layouts discourage these and other searches for particular product attributes. This inability to quickly identify products with particular attributes is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
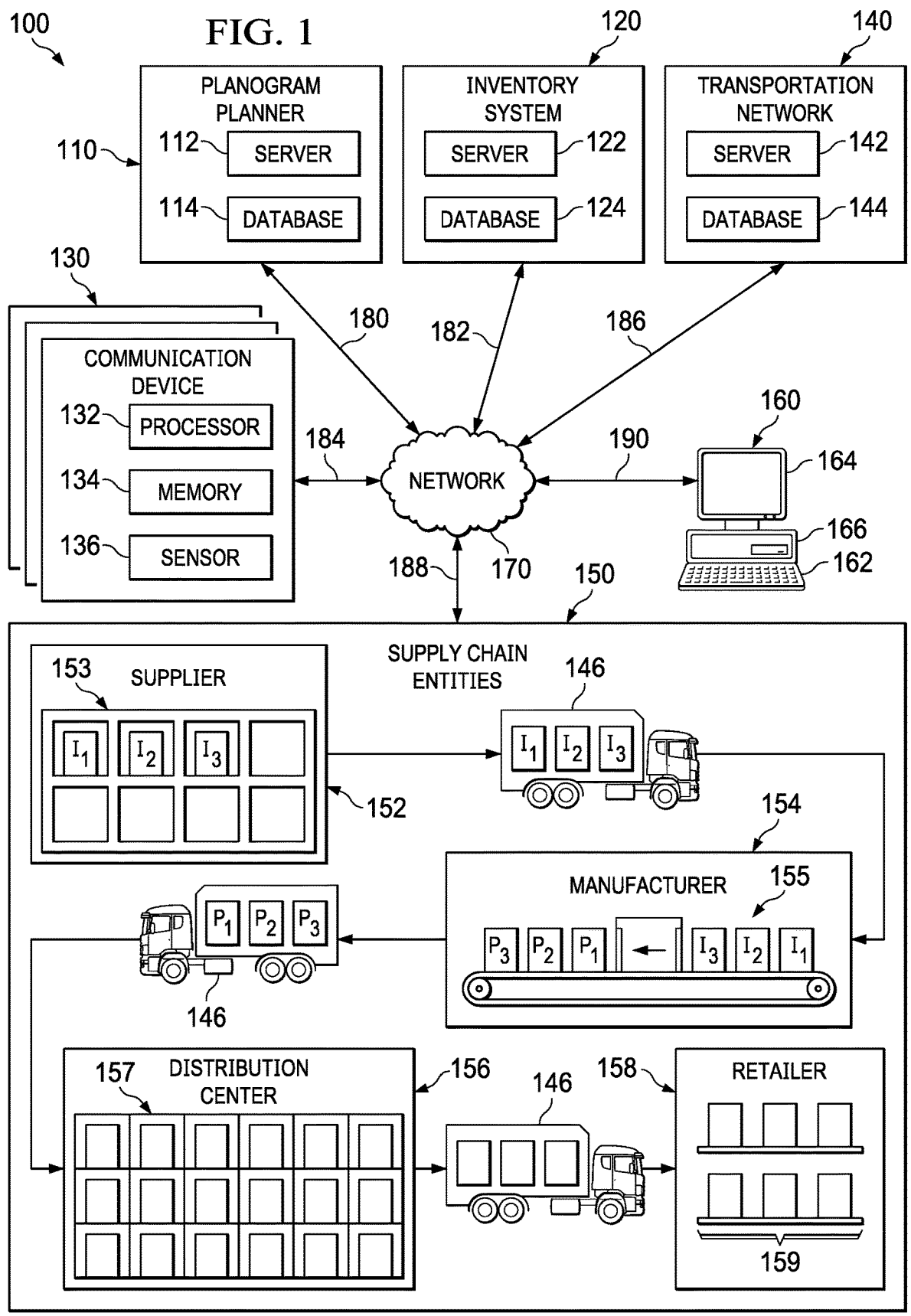
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Retail store layouts may be planned using planograms. Often, planograms comprise documents having two-dimensional illustrations that indicate where particular products should be located on the shelves of a retail store. The planograms may be created at a retail headquarters and then dispatched as documents to individual retail stores. The retail stores then execute the planograms by arranging products on the retail shelves according to the locations identified in the planogram. The selection of the locations identified in the planogram may be based on various information including product information, system reports, marketing plans, and the like. Even though this information is useful, only a limited amount may be displayed on a document planogram and not without compromising the visibility of the product images. Additionally, because a single retail headquarters may create planograms for many retail locations, issues often arise that prevent or delay completing execution of planograms, including, insufficient inventory, incorrect shelving, over-sized products, and the like.

In addition, the locations of products on a retail shelf may be chosen to attract the attention of particular customer segments. Different segments of retail customers perceive a retail store layout differently-products that appeal to one customer segment may be completely ignored by another. Customers who are parents, for example, visualize the store layout differently than customers who are not. It is difficult, however, to identify and visualize the products and sections ignored and noticed by different customer segments. Even when significant efforts are undertaken to emphasize or highlight a new product, customers may still be perceptually blind to the product, which is caused by customers using previous experience to unconsciously discriminate products and sections within a retail store.

Embodiments of the current disclosure relate to, among other things, displaying augmented visualizations that modify images of planograms and real-world shelf spaces to visualize retail store layouts as different customer segments, identify products with particular attributes, and identify the location of issues preventing or delaying planogram execution. As discussed below, the augmented visualizations illustrate segments, product information, and issues on planograms and real-world shelf spaces using renderings or overlays of graphics, colors, text, and the like. The augmented visualizations may then be displayed on augmented reality devices, virtual reality devices, mobile devices, projectors, a planogram creation tool, and the like.

As described more fully herein, according to a first aspect, embodiments of the current disclosure render and display augmented visualizations illustrating product information, system reports, marketing plans, and the like, which provides faster and more accurate planogram audits and changes and adding or removing inventory products. According to a second aspect, embodiments of the current disclosure generate augmented visualizations that displays products and sections of a retail store as a customer of a particular customer segment would notice as they move through a retail store. Retailers may then use the augmented visualizations to plan product layouts to better serve different customer segments.

Planograms are frequently used only by retail employees, but rarely by retail customers. However, according to a third aspect, embodiments of the current disclosure comprise generating augmented visualizations of customer-centric planograms that display customer-relevant planogram information to allow customers to more quickly browse products by ingredients, allergy information, expiration date, brand, category, associated customer segments, and the like. According to a fourth aspect, embodiments of the current disclosure comprise generating issue reporting on planograms. Issue reporting on planograms may comprise generating augmented visualizations such as, for example, heat maps that identify products or shelf locations that have been flagged with issues during planogram execution.

FIG. 1 illustrates an exemplary supply chain network 100 according to a first embodiment. Supply chain network 100 comprises planogram planner 110, inventory system 120, one or more communication devices 130, transportation network 140, one or more supply chain entities 150, computer 160, network 170, and communication links 180-190. Although a single planogram planner 110, a single inventory system 120, a single communication device 130, a single transportation network 140, one or more supply chain entities 150, a single computer 160, and a single network 170, are shown and described, embodiments contemplate any number of planogram planners, inventory systems, imagers, transportation systems, supply chain entities, computers, or networks, according to particular needs.

In one embodiment, planogram planner 110 comprises server 112 and database 114. As explained in more detail below, server 112 of planogram planner 110 comprises one or more modules to, for example, design, store, and transmit planograms, define item groups and hierarchies, segment customers according to preferences or shopping habits, identify and report product and shelving issues, store and transmit product information, and display an augmented visualization of planograms displayed with additional product information. According to embodiments, augmented visualizations of planograms comprise planogram, product, or other information represented using graphics, colors, or text superimposed, overlaid, rendered, or otherwise displayed on a planogram or image of a retail product layout.

Inventory system 120 comprises server 122 and database 124. Server 122 of inventory system 120 is configured to receive and transmit inventory data, including item identifiers, pricing data, attribute data, inventory levels, and other like data about one or more items at one or more locations in the supply chain network 100. Server 122 stores and retrieves inventory data from database 124 or from one or more locations in supply chain network 100.

According to embodiments, inventory database 124 includes current or projected inventory quantities or states, order rules, or explanatory variables. For example, inventory database 124 may comprise the current level of inventory for each item at one or more stocking points across the supply chain network 100. In addition, inventory database 124 may comprise order rules that describe one or more rules or limits on setting an inventory policy, including, but not limited to, a minimum order quantity, a maximum order quantity, a discount, and a step-size order quantity, and batch quantity rules. According to some embodiments, inventory database 124 may comprise explanatory variables that describe the data relating to specific past, current, or future indicators and the data of promotions, seasonality, special events (such as sporting events), weather, and the like. According to some embodiments, planogram planner 110 accesses and stores inventory data in inventory database 124, which may be used by planogram planner 110 to place orders, set inventory levels at one or more stocking points, initiate manufacturing of one or more items, or the like. In addition, or as an alternative, inventory data of inventory database 124 may be updated by receiving current item quantities, mappings, or locations from inventory system 120, one or more communication devices 130, transportation system 140, and/or one or more supply chain entities 150.

According to some embodiments, one or more communication devices 130 receive imaging information from one or more sensors 136 or from one or more databases, such as product information database 224 (FIG. 2), in supply chain network 100. Additionally, one or more communication devices 130 comprise one or more processors 132, memory 134, one or more sensors 136, and may include any suitable input device, output device, fixed or removable computer-readable storage media, or the like. According to embodiments, one or more communication devices 130 identify items near one or more sensors 136 and generate a mapping of the item in supply chain network 100. As explained in more detail below, inventory system 120 and transportation network 140 use the mapping of an item to locate the item in supply chain network 100. The location of the item is then used to coordinate the storage and transportation of items in supply chain network 100 to implement one or more planograms and instruction sets generated by planogram planner 110.

One or more communication devices 130 may comprise a mobile handheld device such as, for example, a smartphone, a tablet computer, a wireless device, or the like. In addition, or as an alternative, one or more communication devices 130 comprise one or more networked communication devices configured to transmit item identity information to one or more databases as an item passes by or is scanned by sensor 136 of one or more communication devices 130. This may include, for example, a stationary scanner located at one or more supply chain entities 150 that identifies items as the items pass near the scanner or a mobile scanner located at one or more supply chain entities 150 that identifies items as the mobile scanner passes by one or more items, such as, for example, a mobile robotic scanner which scans items on store shelves or products in a warehouse. One or more sensors 136 of one or more communication devices 130 may comprise an imaging sensor, such as, a camera, scanner, electronic eye, photodiode, charged coupled device (CCD), or other like sensor that visually detects objects. In addition, or as an alternative, one or more sensors 136 may comprise a radio receiver and/or transmitter configured to read an electronic tag, such as, for example, a radio-frequency identification (RFID) tag. Each of the one or more items may be represented in supply chain network 100 by an identifier, including, for example, Stock-Keeping Unit (SKU), Universal Product Code (UPC), serial number, barcode, tag, RFID, or any other object that encodes identifying information. One or more communication devices 130 may generate a mapping of one or more items in the supply chain network 100 by scanning an identifier or object associated with an item using sensor 136 and identifying the item based, at least in part, on the scan.

Transportation network 140 comprises server 142 and database 144. According to embodiments, transportation network 140 directs one or more transportation vehicles 146 to ship one or more items between one or more supply chain entities 150, based, at least in part, on the on planograms and instruction sets determined by planogram planner 110, mappings of one or more items in the supply chain networks, characteristics of one or more customer segments, declared or resolved issues, and/or one or more other factors described herein. Transportation vehicles 146 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with planogram planner 110, inventory system 120, one or more communication devices 130, transportation network 140, and/or one or more supply chain entities 150 to identify the location of the transportation vehicle 146 and the location of any inventory or shipment located on the transportation vehicle 146. In addition to the supply chain models, the number of items shipped by transportation vehicles 146 in transportation network 140 may also be based, at least in part, on the number of items currently in stock at one or more supply chain entities 150, the number of items currently in transit in the transportation network 140, a forecasted demand, a supply chain disruption, and the like.

As shown in FIG. 1, supply chain network 100 operates on one or more computers 160 that are integral to or separate from the hardware and/or software that support planogram planner 110, inventory system 120, one or more communication devices 130, transportation network 140, and one or more supply chain entities 150. Supply chain network 100 comprising planogram planner 110, inventory system 120, one or more communication devices 130, transportation network 140, and one or more supply chain entities 150 may operate on one or more computers 160 that are integral to or separate from the hardware and/or software that support planogram planner 110, inventory system 120, one or more communication devices 130, transportation network 140, and one or more supply chain entities 150. Computers 160 may include any suitable input device 162, such as a keypad, mouse, touch screen, microphone, or other device to input information. Output device 164 may convey information associated with the operation of supply chain network 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to supply chain network 100.

Computer 160 may include one or more processors 166 and associated memory to execute instructions and manipulate information according to the operation of supply chain network 100 and any of the methods described herein. One or more processors 166 may execute an operating system program stored in memory to control the overall operation of computer 160. For example, one or more processors 166 control the reception and transmission of signals within the system. One or more processors 166 execute other processes and programs resident in memory, such as, for example, registration, identification or communication and moves data into or out of the memory, as required by an executing process. In addition, or as an alternative, embodiments contemplate executing the instructions on computer 160 that cause computer 160 to perform functions of the method. Further examples may also include articles of manufacture including tangible computer-readable media that have computer-readable instructions encoded thereon, and the instructions may comprise instructions to perform functions of the methods described herein. According to some embodiments, the functions and methods described in connection with one or more communication devices 130 may be emulated by one or more modules configured to perform the functions and methods as described.

In addition, and as discussed herein, supply chain network 100 may comprise a cloud-based computing system having processing and storage devices at one or more locations, local to, or remote from planogram planner 110, inventory system 120, one or more communication devices 130, transportation network 140, and one or more supply chain entities 150. In addition, each of the one or more computers 160 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the planogram planer 110, inventory system 120, one or more communication devices 130, transportation network 140, and one or more supply chain entities 150.

These one or more users may include, for example, a "manager" or a "planner" handling generation of planograms and instruction sets, managing the inventory of items, imaging items, managing storage and shipment of items, managing categories of products, generating customer segments, reporting and resolving issues, and/or one or more related tasks within supply chain network 100. In addition, or as an alternative, these one or more users within supply chain network 100 may include, for example, one or more computers programmed to autonomously handle, among other things, planogram planning, shelving resets, task management, communication and assignment of planograms and instructions, issue identification and resolution, controlling manufacturing equipment, and adjusting various levels of manufacturing and inventory levels at various stocking points and distribution centers, and/or one or more related tasks within supply chain network 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers 154. Items may comprise, for example, parts or supplies used to generate products. An item may comprise a part of the product, or an item may comprise a supply that is used to manufacture the product, but does not become a part of the product, for example, a tool, energy, or resource. According to some embodiments, items comprise foods or ingredients. Suppliers 152 may comprise automated distribution systems 153 that automatically transport products to one or more manufacturers 154 based, at least in part, on planograms and instruction sets determined by planogram planner 110, mappings of one or more items in the supply chain networks, characteristics of one or more customer segments, declared or resolved issues, and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in supply chain network 100, such as retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery 155 that produce products based, at least in part, on planograms and instruction sets determined by planogram planner 110, mappings of one or more items in the supply chain networks, characteristics of one or more customer segments, declared or resolved issues, and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entities 150 in supply chain network 100 and store and transport the product for a second one or more supply chain entities 150. Distribution centers 156 may comprise automated warehousing systems 157 that automatically remove products from and place products into inventory based, at least in part, on planograms and instruction sets determined by planogram planner 110, mappings of one or more items in the supply chain networks, characteristics of one or more customer segments, declared or resolved issues, and/or one or more other factors described herein.

Retailers 158 may be any suitable entity that obtains one or more products to sell to one or more customers. Retailers 158 may (like the other one or more supply chain entities 150), comprise a corporate structure having a retail headquarters and one or more retail stores. Retail headquarters comprises a central planning office with oversight of one or more retail stores. Retail stores may comprise any online or brick-and-mortar store, including stores with shelving systems 159. The one or more retail stores of retailer 158 may sell products according to rules, strategies, orders, and/or guidelines developed by one or more retail headquarters. For example, retail headquarters may create planograms and instruction sets that determine how the store will shelve or display one or more products. Although planogram execution may be performed by a retail employee, embodiments contemplate automated configuration of shelving and retail displays. This may include, for example, automated robotic shelving machinery that places products on shelves or automated shelving that automatically adjusts based, at least in part, on planograms and instruction sets determined by planogram planner 110, mappings of one or more items in the supply chain networks, characteristics of one or more customer segments, declared or resolved issues, and/or one or more other factors described herein. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailer 158 using computer-generated instructions displayed on one or more communication devices 130 or automatically by machinery that place products in the appropriate location on shelving systems 159 or adjusts shelving systems 159 as indicated by planograms 240, instruction sets, and/or tasks.

Although one or more supply chain entities 150 are shown and described as separate and distinct entities, the same entity may simultaneously act as more than one of the one or more supply chain entities 150. For example, one or more supply chain entities 150 acting as a manufacturer can produce a product, and the same one or more supply chain entities 150 can act as a supplier to supply an item to itself or another one or more supply chain entities 150. Although one example of a supply chain network 100 is shown and described, embodiments contemplate any configuration of supply chain network 100, without departing from the scope described herein.

In one embodiment, planogram planner 110 may be coupled with network 170 using communications link 180, which may be any wireline, wireless, or other link suitable to support data communications between planogram planner 110 and network 170 during operation of supply chain network 100. Inventory system 120 may be coupled with network 170 using communications link 182, which may be any wireline, wireless, or other link suitable to support data communications between inventory system 120 and network 170 during operation of supply chain network 100. One or more communication devices 130 are coupled with network 170 using communications link 184, which may be any wireline, wireless, or other link suitable to support data communications between one or more communication devices 130 and network 170 during operation of distributed supply chain network 100. Transportation network 140 may be coupled with network 170 using communications link 186, which may be any wireline, wireless, or other link suitable to support data communications between transportation network 140 and network 170 during operation of supply chain network 100. One or more supply chain entities 150 may be coupled with network 170 using communications link 188, which may be any wireline, wireless, or other link suitable to support data communications between one or more supply chain entities 150 and network 170 during operation of supply chain network 100. Computer 160 may be coupled with network 170 using communications link 190, which may be any wireline, wireless, or other link suitable to support data communications between computer 160 and network 170 during operation of supply chain network 100.

Although communication links 180-190 are shown as generally coupling one or planogram planner 110, inventory system 120, one or more communication devices 130, transportation network 140, one or more supply chain entities 150, and computer 160 to network 170, any of planogram planner 110, inventory system 120, one or more communication devices 130, transportation network 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling planogram planner 110, inventory system 120, one or more communication devices 130, transportation network 140, one or more supply chain entities 150, and computer 160. For example, data may be maintained locally to, or externally of planogram planner 110, inventory system 120, one or more communication devices 130, transportation network 140, one or more supply chain entities 150, and computer 160 and made available to one or more associated users of planogram planner 110, inventory system 120, one or more communication devices 130, transportation network 140, one or more supply chain entities 150, and computer 160 using network 170 or in any other appropriate manner. For example, data may be maintained in a cloud database at one or more locations external to planogram planner 110, inventory system 120, one or more communication devices 130, transportation network 140, one or more supply chain entities 150, and computer 160 and made available to one or more associated users of planogram planner 110, inventory system 120, one or more communication devices 130, transportation network 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, planogram planner 110 may generate planograms and instruction sets for the inventory of one or more supply chain entities 150 in supply chain network 100. Furthermore, planogram planner 110, inventory system 120, and/or transportation network 140 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of products based on one or more planograms and instruction sets, mappings of one or more items in the supply chain networks, characteristics of one or more customer segments, declared or resolved issues, generated plans and policies and/or current inventory or production levels. When the inventory of an item falls to a reorder point, planogram planner 110 may then automatically adjust planograms, instruction sets, product layouts, product mix ratios, inventory levels, production of products of manufacturing equipment, and proportional or alternative sourcing of one or more supply chain entities until the inventory is resupplied to a target quantity.

For example, the methods described herein may include computers 160 receiving product data from automated machinery having at least one sensor and the product data corresponding to an item detected by one or more communication devices 130 of the automated machinery. The received product data may include an image of the item, an identifier, as described above, and/or attributes associated with the item (dimensions, texture, estimated weight, and any other like data). The method may further include computers 160 automatically looking up received product data in product information database 224 (FIG. 2) or other database system associated with planogram planner 110, inventory system 120, one or more communication devices 130, and/or transportation network 140 to identify the item corresponding to the product data received from the automated machinery.

The computers may also receive, from the automated machinery, a current location of the identified item. Based on the identification of the item, computers may also identify (or alternatively generate) a first mapping in the database system, where the first mapping is associated with the current location of the item. Computers may also identify a second mapping in the database system, where the second mapping is associated with a past location of the identified item. Computers may also compare the first mapping and the second mapping to determine if the current location of the identified item in the first mapping is different than the past location of the identified item in the second mapping. Computers may then send instructions to the automated machinery based, as least in part, on one or more differences between the first mapping and the second mapping such as, for example, to locate an item to add to or remove from a shelf or inventory of one or more supply chain entities 150 or a shipment to or from one or more supply chain entities 150. In addition, or as an alternative, planogram planner 110 monitors the supply chain constraints of one or more items at one or more supply chain entities 150 and adjusts the orders and/or inventory of the one or more supply chain entities 150 based on the supply chain constraints.

Figure 2:
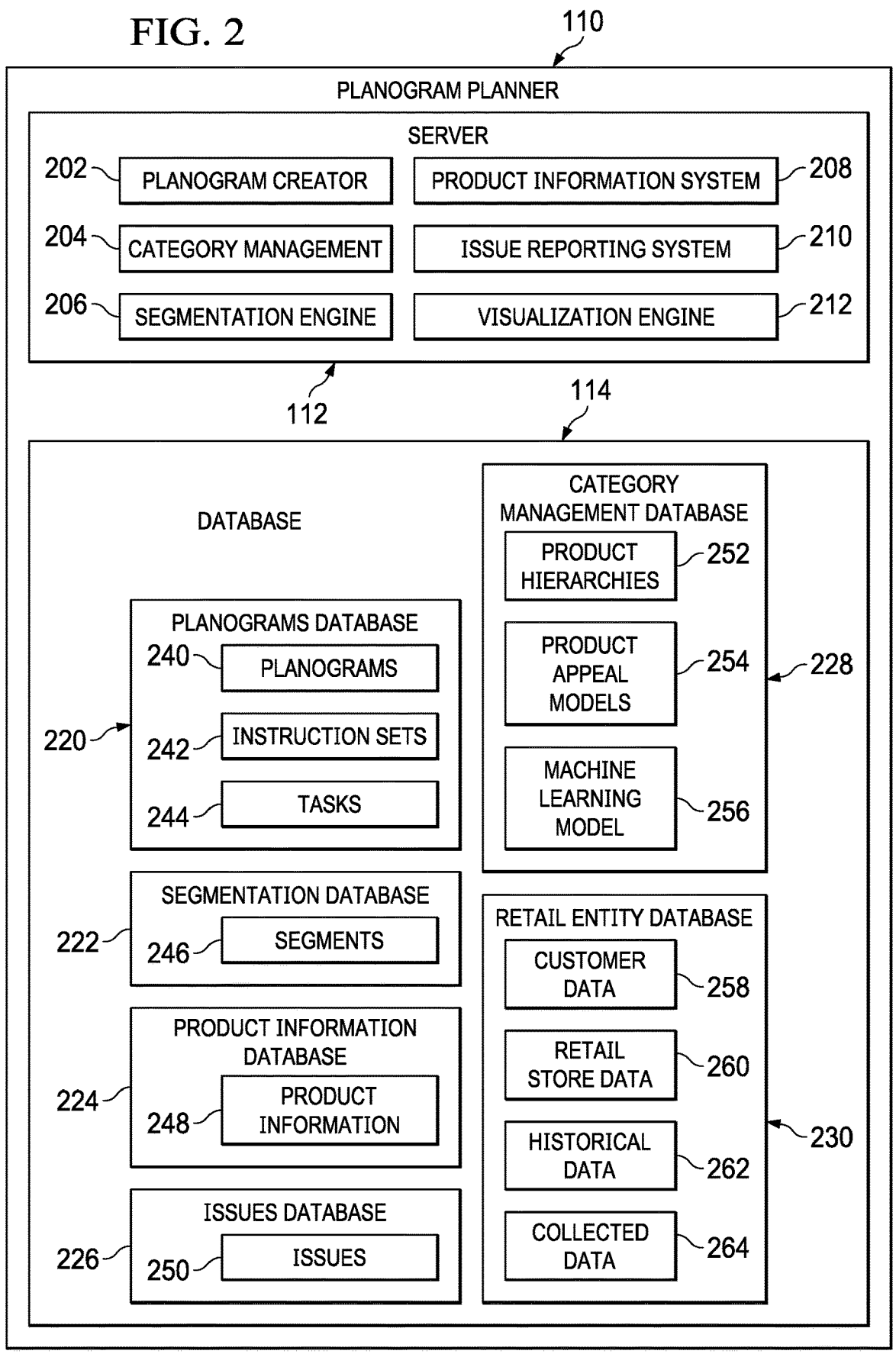
FIG. 2 illustrates the planogram planner of FIG. 1 in greater detail in accordance with an embodiment.

FIG. 2 illustrates planogram planner 110 of FIG. 1 in greater detail in accordance with an embodiment. As discussed above, planogram planner 110 may comprise one or more computers 160 at one or more locations including associated input devices 162, output devices 164, non-transitory computer-readable storage media, processors 166, memory, or other components for receiving, processing, storing, and communicating information according to the operation of supply chain network 100. Additionally, planogram planner 110 comprises server 112 and database 114. Although planogram planner 110 is shown as comprising a single computer 160, a single server 112, and a single database 114, embodiments contemplate any suitable number of computers, servers, or databases internal to or externally coupled with planogram planner 110. According to some embodiments, planogram planner 110 may be located internal to one or more retailers 158 of one or more supply chain entities 150. In other embodiments, planogram planner 110 may be located external to one or more retailers 158 of one or more supply chain entities 150, according to particular needs.

Server 112 of planogram planner 110 may comprise planogram creator 202, category management module 204, segmentation engine 206, product information system 208, issue reporting system 210, and visualization engine 212.

Although planogram planner 110 is illustrated as comprising planogram creator 202, category management module 204, segmentation engine 206, product information system 208, issue reporting system 210, and visualization engine 212, embodiments contemplate any suitable number or combination of these located at one or more locations, local to, or remote from planogram planner 110, such as on multiple servers or computers at any location in supply chain network 100. In addition, some modules, engines, and systems that may be coupled with the foregoing or planogram planner 110 have been omitted for the sake of clarity.

Planogram creator 202 comprises a module to design, store, modify, and transmit planograms 240. According to embodiments, planogram creator 202 comprises various sub-modules, engines, and systems for creating, managing, and executing instructions and tasks associated with planograms 240, evaluating planogram 240 execution, and calculating and displaying analytics. For example, planogram creator 202 may, according to some embodiments, comprise an instruction builder sub-module to build and package instruction sets that are sent with planograms 240; a task manager sub-module to display and execute planograms 240 and instructions; an execution evaluator sub-module to evaluate planogram compliance, such as, for example, evaluating completed shelf resets based planograms 240 and instructions; and an analytics engine to calculate and display collected data on planograms 240, including, for example, task completion rates, execution time for planograms 240 or tasks, issue occurrence rates and types, sales performance correlated to issues, issue monitoring and solutions, planogram quality, the identification of persons involved in creating, communicating, and executing planograms 240, and the like.

Category management module 204 comprises a module to categorize and group products into a hierarchy of classes and sub-classes. According to embodiments, products are grouped and categorized into the classes and sub-classes based, at least in part on, the similarity or substitutability of one or more products with one or more other products.

According to embodiments, segmentation engine 206 comprises an engine that uses a clustering method to group customers into segments 246 based, at least in part, on customer features. Customer features express a customer's shopping habits and may include the customer's likelihood to purchase products of a particular category having particular product attributes. Customer features may be derived from customer-identifiable transaction-level sales data, which comprises transaction information of retail product purchases for identifiable customers, and may comprise one or more of the times, locations, prices, and payment methods of one or more transactions, the identity and attributes of one or more purchased or returned products, and the identities and amounts of any promotions. According to some embodiments, customer features comprise the proportion relating the number of products in a category purchased by a customer having one or more particular attributes with the total number of products in the category purchased by the customer. Customer features may include, for example, the proportion of purchased products with the attribute 'low fat', the proportion of purchased products with brand 'xyz', the proportion of purchased products with flavor 'c', or any suitable proportion, ratio, percentage, or other expression of a customer's likelihood or preference for products of a particular category having particular product attributes. According to some embodiments, customer features may include shopping habits, preferred formats, customer price sensitivity, favored promotions, the identity of products purchased together, and the like.

Segmentation engine 206 identifies groups of customers that share similar customer features using a clustering method and generates a list of customer segments 246. Customer segments 246 comprises groupings of customers and characteristics associated with customers in the groupings. Customer characteristics comprise a subset of customer features associated with each customer segment 246 and which were computed by segmentation engine 206 to be representative of or correlated with the customer segments 246. Additionally, customer characteristics may include post-clustering customer information about the customers in each segment 246, which was not used during the clustering method but which, instead, is calculated after the segments 246 are computed. This post-clustering customer information may include, for example, calculations and statistics based on demographics (such as age, gender, race, ethnicity, birthplace, and the like), customer wages and finances, education level, and the like and may include, for example, the average age and average income of customers in each segment 246.

According to embodiments, product information system 208 comprises a system that stores and transmits product information 248. Product information 248 may include any attribute-based information such as, for example, ingredients, brand, price, promotion, allergy information, inventory availability, and the like. Product information 248 may also include item information such as expiration date, shipping information, lead time, and the like.

Issue reporting system 210 comprises a system to receive, store, and transmit issues 250. According to embodiments, issues 250 comprise the identity of one or more problems that prevented or delayed the complete execution of planograms 240, instruction sets, or tasks. According to embodiments, issue reporting system 210 receives issues 250 from one or more communication devices 130 occurring during execution of planograms 240, instruction sets 242, or tasks 244.

Visualization engine 212 renders augmented visualizations of planograms and real-world shelf spaces. According to some embodiments, visualization engine 212 identifies and maps products appearing in a planogram 240 or real-world shelf space and generates an augmented visualization of the planogram or real-world shelf space by rendering or overlaying graphics, colors, text, or the like to indicate which segments 246, product information 248, and/or issues 250 are associated with the identified products and mapped locations. Visualization engine 212 transmits the rendered augmented visualization of a planogram or retail shelf space and displays the rendering on a display such as, for example, output device 164 of a computer 160 or a display coupled with one or more communication devices 130, such as, for example, an augmented reality headset (e.g. a MICROSOFT HOLO-LENS or EPSON MOVERIO augmented reality headset), a projector, a smartphone, a handheld retail barcode scanner, a tablet computer, and the like.

Database 114 of planogram planner 110 may comprise one or more databases or other data storage arrangement at one or more locations, local to, or remote from, server 112. Database 114 comprises, for example, planogram database 220, segmentation database 222, product information database 224, issues database 226, category management database 228, and retail entity database 230. Although, database 114 is shown and described as comprising planogram database 220, segmentation database 222, product information database 224, issues database 226, category management database 228, and retail entity database 230, embodiments contemplate any suitable number or combination of these, located at one or more locations, local to, or remote from, planogram planner 110 according to particular needs.

Planograms database 220 comprises one or more databases or other data storage arrangement at one or more locations, local to, or remote from, server 112 that stores planograms 240, instruction sets 242, and tasks 244. According to embodiments, planograms 240 comprise a physical or digital representation of the arrangement of products on a shelf or other retail display. According to some embodiments, planograms 240 comprise images of products arranged in the same layout as the products will appear on the shelves of a retail store 404 when executed correctly. According to other embodiments, planograms 240 comprise one or more digital formats that represent products and product placement as sequences of data structures that may be more easily transmitted and modified by modules or components of one or more of planogram planner 110, inventory systems 120, communication devices 130, transportation network 140, one or more supply chain entities 150, and/or computer 160 of planogram planning system 100.

Instruction sets 242 may comprise particular actions, inquiries, care instructions, or the like that may be used in connection with planogram 240 to provide information needed for planogram execution. Tasks 244 comprise instruction sets 242 (which may include one or more planograms 240) and are associated with a particular retail store or section of a store and may be dispatched to one or more retail stores at one or more locations. Examples of tasks 244 include, for example, resetting the shelves in a particular section of a particular store, such as, for example, arranging the juice or soup section of a grocery store, or arranging the toy section of a big-box retailer.

Segmentation database 222 comprises one or more databases or other data storage arrangement at one or more locations, local to, or remote from, server 112 that stores customer segments 246. Customer segments 246 comprise lists of customers which are placed in groups organized around similar shopping characteristics.

Product information database 224 comprises one or more databases or other data storage arrangement at one or more locations, local to, or remote from, server 112 that stores product information 248. Product information 248 comprises any attribute-based information such as, for example, ingredients, brand, price, promotion, allergy information, inventory availability, identifiers, dimensions, product images, three-dimensional product representations, hierarchy information, substitutable products, target service levels, and the like. Product information 248 may also include item information such as expiration date, shipping information, lead time, and the like.

Issues database 226 comprises one or more databases or other data storage arrangement at one or more locations, local to, or remote from, server 112 that stores issues tickets 250 According to embodiments, issues 250 comprise the identity of one or more problems that prevented or delayed the complete execution of planograms 240, instruction sets 242, or tasks 244.

Category management database 228 comprises one or more databases or other data storage arrangement at one or more locations, local to, or remote from, server 112 that stores product hierarchies 252 and product appeal models 254. Product hierarchies 252 comprises a hierarchical arrangement of classes and sub-classes that organize products into groups and categories based, at least in part, on the similarity or substitutability of one or more products with one or more other products. Product appeal models 254 comprise models to predict the likelihood of a product's appeal to a customer based, at least in part, product attributes, customer segment characteristics, and substitutability or similarity among the products.

Retail entity database 230 comprises one or more databases or other data storage arrangement at one or more locations, local to, or remote from, server 112 that stores customer data 258, retail store data 260, historical data 262, and collected data 264. Customer data 258 may comprise demographics (such as age, gender, race, ethnicity, birthplace, and the like), customer wages and finances, education level, customer features, and the like. Customer features may be derived from customer-identifiable transaction-level sales data, as described above, and may include shopping habits, customer price sensitivity, favored promotions, the identity of products purchased together, and the like. Retail store data 260 comprises data describing physical attributes of retail stores, including, for example, the types and dimensions of shelving and retail displays, store layout, specialty products specific to that region, and the like.

Historical data 262 comprises, for example, any data relating to past sales, past demand, purchase data, promotions, events, or the like of one or more supply chain entities 150. Historical data 262 may be stored at time intervals such as, for example, by the minute, hour, daily, weekly, monthly, quarterly, yearly, or any suitable time interval, including substantially in real time. Collected data 264 comprises any data collected in associated with execution of a planogram 240, instruction set 242, and task 244, including, for example, completion time, execution time of particular actions, the number and types of issues 250 that arose during execution, the retail store where planogram 240, instruction set 242, and/or task 244 were executed, sales performance of executed products, compliance with planogram 240, the identification of persons involved in creating, communicating, and executing planogram 240, instruction set 242, and task 244, and the like.

Figure 3:
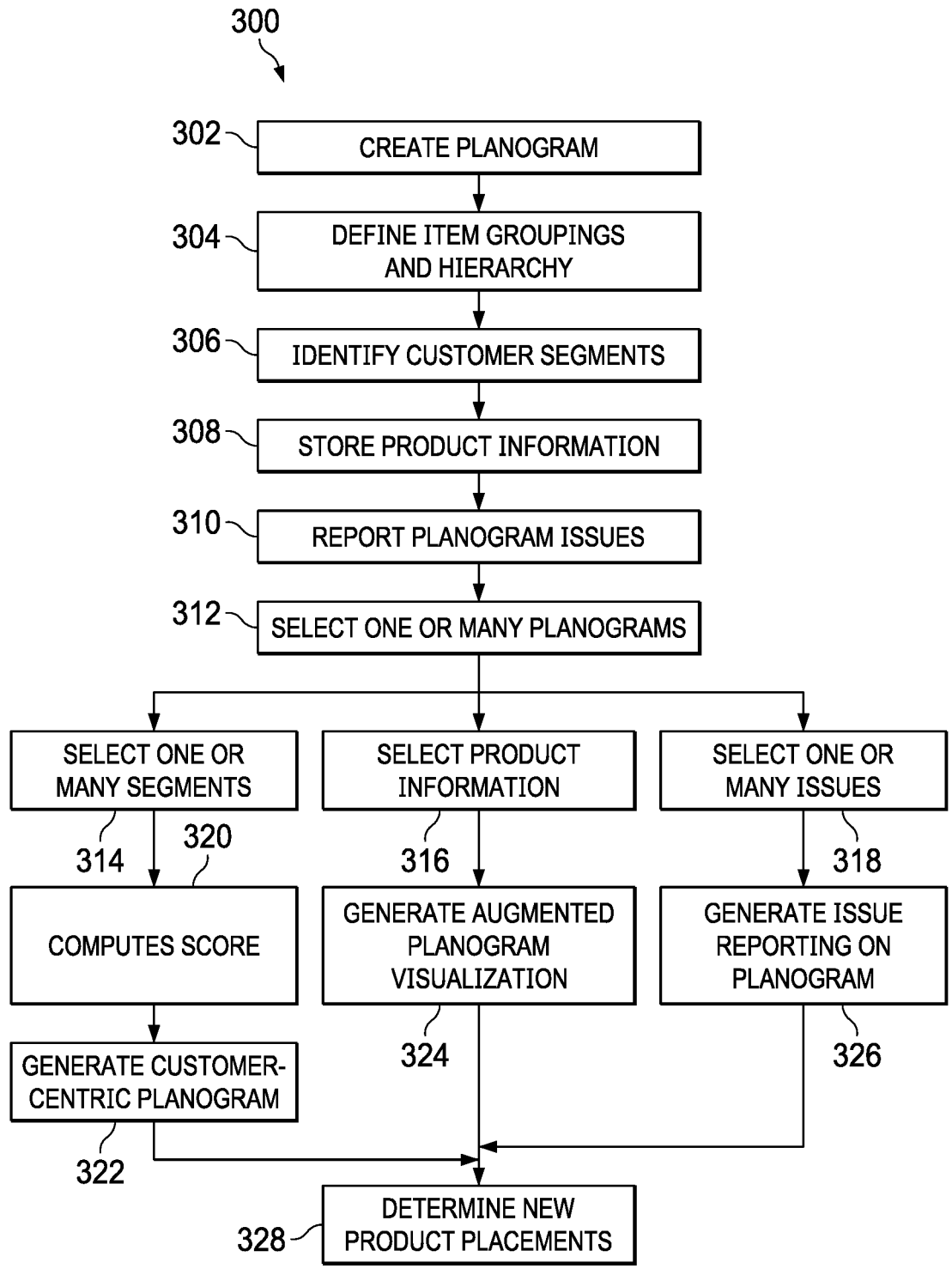
FIG. 3 illustrates an exemplary method of generating augmented visualizations according to an embodiment.

FIG. 3 illustrates an exemplary method 300 of generating augmented visualizations according to an embodiment. The following method 300 proceeds by one or more activities, which although described in a particular order may be performed in one or more permutations, combinations, orders, or repetitions, according to particular needs. Method 300 begins at activity 302 where planogram creator 202 of planogram planner 110 creates a planogram 240 based, at least in part on, historical data 262, product information 248, business requirements, sales objectives, promotions, and/or other like information. As described in more detail below, planogram creator 202 creates a planogram comprising planned locations for products on retail shelves, stores the planogram 240 on planogram database 220.

At action 304, category management engine 204 categorizes and groups products into a hierarchy of classes and sub-classes. According to embodiments, products are grouped and categorized into the classes and sub-classes based, at least in part on, the similarity or substitutability of products. At action 306, segmentation engine 206 identifies customer segments 246 using a clustering method. Segmentation engine 206 generates one or more customer segments 246 comprising a list of customers belonging to each customer segment and characteristics representative of or correlated with the customer segments 246. At action 308, product information system 208 stores product information 248 comprising product attribute information or item information, as described above.

At action 310, issue reporting system 210 may receive one or more issues 250 from one or more communication devices 130. According to embodiments, one or more communication devices 130 report issues 250 that occur during execution of planograms 240, instruction sets 242, or tasks 244 to issue reporting system 210. After receiving issues 250, issue reporting system 210 may associate the issue with one or more planograms 240, instruction sets 242, tasks 244, products, shelf locations, or the like, and store the issues 250 in issues database 226.

At action 312, visualization engine 212 selects one or more planograms 240. The selected planogram 240 comprises an illustration of the products and shelving of a portion of a retail location. As described below, the illustration of planogram 240 will be modified to generate a customer-centric planogram, an augmented visualization of a planogram, and/or issue reporting on a planogram. Depending on the type of visualization desired, the method may continue to action 314 (customer-centric planograms), action 316 (augmented visualization of a planogram), or action 318 (issue reporting on a planogram). At action 314, planogram planner 110 selects one or more segments 246, which comprise groups of customers and characteristics that determine how customer-centric planogram will be generated. As discussed above, customer-centric planogram comprises an illustration of the products and shelving of a portion of a retail location rendered or overlaid with graphics, colors, or text that represent how products and sections of a retail location appears to customers in the selected one or more segments.

At action 320, category management system 228 builds a product appeal model to calculate the likelihood that a product would appeal to customers in the one or more selected customer segments. Category management system 228 may then score each product on the customer-centric planogram using the product appeal model and based on the characteristics of the one or more selected customer segments. At action 322, visualization engine 212 generates a customer-centric planogram based, at least in part, on the selected planogram 240, the one or more selected segments 246, and the product appeal scores for each product. Visualization engine 212 may generate customer-centric planogram by overlaying or rendering colors on planogram 240 to de-emphasize products having a low product appeal score and to emphasize products having a high product appeal score. For example, images of the products having a low product appeal score may be overlaid with a grey color which obscures and de-emphasizes those products, while products having a high appeal score would not be obscured or may be highlighted.

Returning to action 316, planogram planner 110 selects product information 248. As described above, product information 248 comprises any attribute-based information or item information that may be displayed in connection with one or more products on a planogram 240 or retail shelf space. At action 324, visualization engine 212 generates an augmented visualization of a planogram 240 based, at least in part, on the selected planogram 240 and product information 248. According to embodiments, visualization engine 212 renders or overlays graphics, colors, text, and the like on images of planograms and real-world shelf spaces to illustrate product information 248.

Returning to action 318, planogram planner 110 selects one or more issues 250. As described above, issues 250 comprise the identity of one or more problems that prevented or delayed the execution of planograms 240, instruction sets 242, or tasks 244. After receiving issues 250, issue reporting system 210 may associate the issue with one or more planograms 240, instruction sets 242, tasks 244, products, shelf locations, or the like. According to embodiments, planogram planner 110 automatically selects issues 250 that are associated with the planogram 240 selected at action 312. Additionally, planogram planner 110 may automatically deselect issues 250 which have been resolved or are not affecting current planogram executions.

At action 326, visualization engine 212 generates issue reporting on a planogram based, at least in part, on the selected planogram 240 and one or more issues 250. As described in more detail below, visualization engine 212 renders or overlays graphics, colors, text, and the like on images of planograms and real-world shelf spaces to illustrate the location of issues 250. According to some embodiments, issue reporting on a planogram comprises a heat map, which is described in detail below.

At action 328, planogram planner 110 determines new product placements based, at least in part, on the visualization of one or more planograms. For example, based on the products emphasized and de-emphasized on customer-centric planogram, planogram planner 110 may increase sales to customers of the one or more selected segments 246 by relocating the products identified as highly appealing to these customers. Relocating the highly-appealing products may comprise moving all the products to one side, spreading the products in different areas, or locating the products at opposite ends of a shelf space, which causes the customer's eyes to travel across the entire shelf space and increases the chance of the customer purchasing more products than the customer intended.

According to a further example, planogram planner 110 may modify planograms 240, instruction sets 242, and/or tasks 244 based on issue reporting on a planogram. For example, planogram planner 110 may resolve one or more issues 250 by eliminating or modifying any products, instructions, actions, shelf locations, or the like which caused issues 250 when executing planograms 240, instruction sets 242, and/or tasks 244.

In order to further explain method 300 of generating augmented visualizations several examples are now given.

Figure 4:
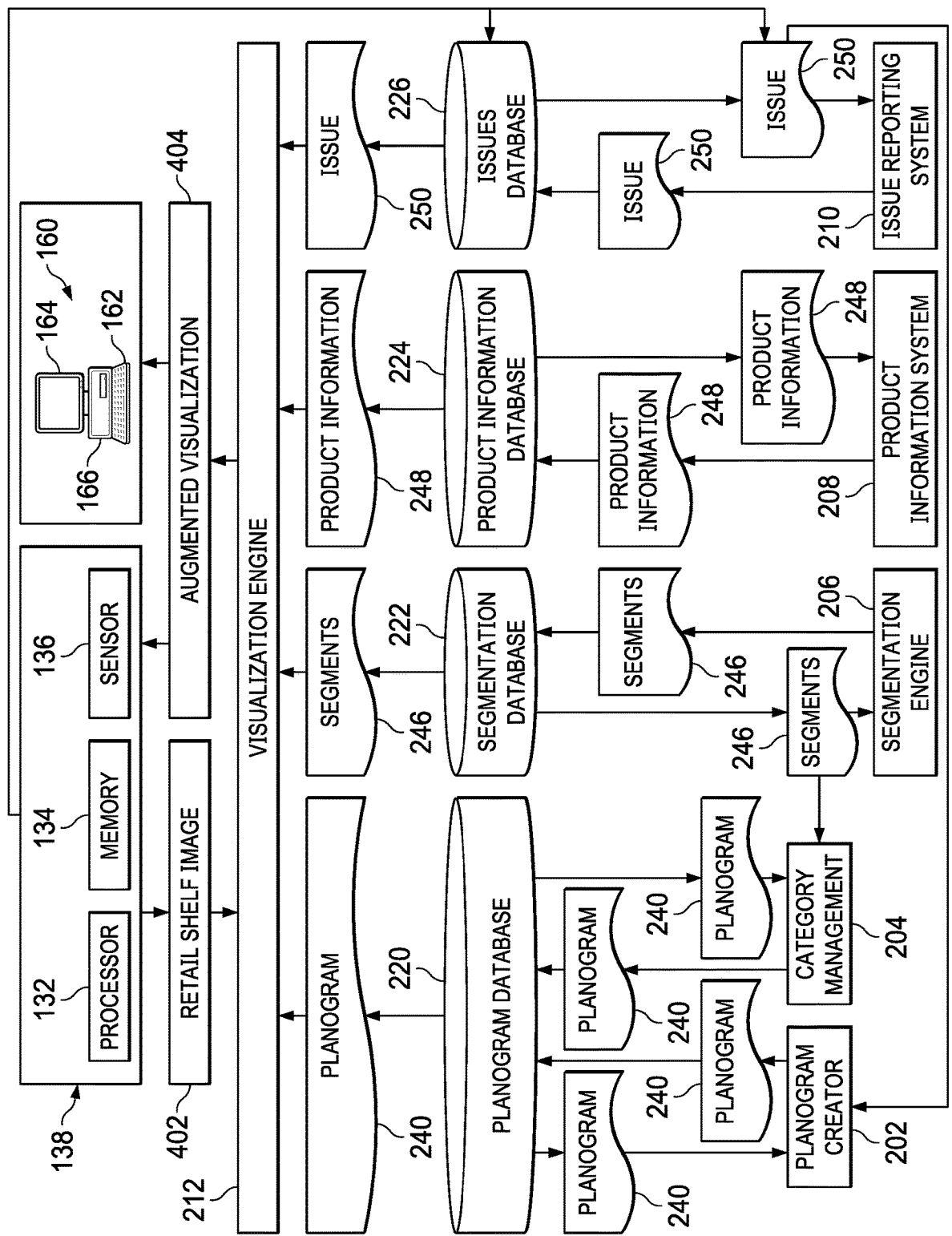
FIG. 4 illustrates an exemplary planogram planner, according to a further embodiment.

FIG. 4 illustrates an exemplary planogram planner 110, according to a further embodiment. As discussed above, planogram creator 202 of planogram planner 110 creates a planogram 240 based on, for example, historical data 262, product information 248, business requirements, sales objectives, promotions, and other like information. Planogram creator 202 stores and receives planograms 240 from planogram database 220. According to embodiments, planogram 240 comprises spatial coordinates and is presented in a standardized format that may include information such as the dimension, number, and location of shelves and the identification information, dimension, attributes, and location of one or more products. The information may comprise text such as, "Shelf 1 is [length dimension] and is at [location] in the planogram," and "[Product N] is [size]." Planogram creator 202 stores planogram 240 in planogram database 220. As described above, planogram 240 comprises a plan of the arrangement of shelves and products in a section of targeted stores. Planogram 240 may be sent to retail stores as images, PDFs, or other static formats. According to some embodiments, planogram 240 comprises a flexible format, such as, for example, planogram 240 may be communicated to a store through JSON or a markup language. For example:

```
<planogram>
  <shelve>
    <product />
    ...
  </shelve>
  ...
</planogram>
```

In this way, planogram 240 is viewable as a graphical representation on a communication device, and the planogram may better address informational needs at each part of the process. Planogram database 220 may be located at one or more locations remote or local to headquarters or stores of retailer 158, and provide access to one or more users to modify or consult.

Category management system 204 stores and receives planograms 240 from planogram database 220 and receives customer segments 246 from segmentation database 222. As discussed above, the category management system 204 defines groups of products that may be included in a particular category including a product hierarchy 252 comprising classes and sub-classes. These classes and sub-classes comprise groupings of products that are sorted according to their similarity or substitutability with other products. Categories, classes, and sub-classes may include as many or as few items as necessary to accurately group items. Category management system uses product hierarchies 252 to, for example, create and modify planograms 240.

To further illustrate the categorization of a product, an example is now given. Food products in a grocery store may be organized into various categories. One possible category is pasta sauces. The category of pasta sauces may include all sauces suitable for serving with any type of pasta. However, such a large category may not accurately capture the relationship of different pasta sauces. Therefore, pasta sauces may be divided into different categories, such as categories for different types of pasta sauce, such as, for example, categories for marinara sauce, alfredo sauce, pesto, and a category for pasta sauces that do not fit into the other categories or any other particular types of pasta sauce. By way of another example, categories for pasta sauce may be based on particular flavors of the sauce (such as categories for garlic-flavored sauces, tomato-flavored sauces, mushroom-flavored sauces, and the like). Although the example of categorization is given in relation to pasta sauces, categories may comprise any grouping of products for any type of retailer. For example, the categories of products may represent products at a home improvement store, such as different tools, building supplies, hardware, or the like. By way of a further example, the categories of products for a clothing retailer may represent a particular type of clothing, brand of clothing, segmentation level, or the like.

Also, as discussed above, segmentation engine 206 groups customers into customer segments 246 based on their preferences or shopping habits, such as, for example, a favorite brands, flavors, and formats in each category, price sensitivity, favored promotions, and the identity of products bought together. Segmentation engine 206 associates customer features with specific customers and then uses a clustering method to identify groups of customers who share similar characteristics. Segmentation engine 206 may then generate a list of customer segments, customer characteristics associated with those segments, and the identity of customers who are associated with the customer segments. According to embodiments, customer characteristics comprise the customer features which were used by segmentation engine 206 to generate customer segments 246. Additionally, customer characteristics may comprise data that is calculated after customer segmentation is complete, such as, for example, the average age and income of customers in the various customer segments.

To further describe segmentation, examples are now given. For an exemplary grocery customer, a segment may comprise customers divided based on particular dietary needs and spending habits, such as: "customers that buy healthy products that do not contain gluten and at a higher price point." For an exemplary clothing retail customer, a segment may comprise customer organized around fashion sense, clothing that is most often bought, or spending habits, such as: "Fashion Tops Shopper," "New-Design Enthusiast," "Fashion Customer," "Basic Jeans Buyer," "Value Shopper," and "Skinny Jeans Buyer." Customers divided into these segments share certain buying habits and patterns, and segmentation engine 206 may present data organized by each segment. Such data about the particular segments may include, for example: total customers in the segment, number of customers who bought items in a particular department or store, number of visitors in the segment to a particular department or store, maximum visits in a department, total spending in the department or store, total items purchased, identification of items purchased, items purchased at a regular price, promotional price, or clearance price, items purchased online or in brick-and-mortar store, average number of items purchased by a customer in the segment, average spending by a customer in the segment, average profit on a customer in the segment, average spending by visit, average discount by item by customer in the segment, demographics of customers in a segment including geographical location, education, housing type, household composition, occupation, marital status, and any product information about products purchased or not purchased by the customer in the segment, including sizes, shapes, styles, patterns, fashion type, or any other product information. Although particular examples of customer segments 246 for various industries are described, embodiments contemplate any suitable segmentation of customers in any industry according to any customer characteristics, according to particular needs.

Using customer segments 246 created by segmentation engine 206, category management system 204 calculates a score representing the likelihood that a product would appeal to customers belonging to a particular customer segment. As described in more detail below, visualization engine 212, uses scores to determine the visualization of products on an augmented visualization 404 or planogram 240 For example, products with a score falling below a certain threshold may be greyed out or removed from augmented visualization 404, and products above a certain threshold would be displayed or highlighted.

According to embodiments, product information system 208 comprises a system that stores and receives product information 248 from product information database 224. As discussed above product information 248 may include any attribute-based information and item information. Visualization engine 212 receives product information 248 from product information database 224 to identify and map products in planograms 240 and retail shelf images 402 and illustrates the product information 248 in augmented visualizations 404.

Issue reporting system 210 stores and receives issues 250 from issues database 226. As discussed above, issues 250 may comprise the identity of one or more problems that prevented or delayed the complete execution of planograms 240, instruction sets 242, or tasks 244. According to embodiments, one or more communication devices 130 transmit issues 250 that occur during execution of planograms 240, instruction sets 242, or tasks 244 to issue reporting system 210. After receiving issues 250, issue reporting system 210 may associate the issue with one or more planograms 240, instruction sets 242, tasks 244, products, shelf locations, or the like, store the issues 260 in issues database 226, and transmit the issues 250 to planogram creator 202, which may resolve the issues 250 by modifying planograms 240, instruction sets 242, and/or tasks 244 to eliminate or mitigate the cause of issue 250 which may include, for example, eliminating or modifying a product, instruction, action, shelf location, or the like from planograms 240, instruction sets 242, and/or tasks 244.

According to some embodiments, visualization engine 212 uses one or more planograms 240, segments 246, product information 248, issues 250, and retail shelf images 402 to generate augmented visualizations 404 for display on one or more communication devices 130 and computer 160. For example, visualization engine 212 may modify planogram 240 to generate a customer-centric planogram, an augmented visualization of a planogram, and/or issue reporting on a planogram. Depending on the type of augmented visualization, visualization engine 212 may generate customer-centric planograms using one or more planograms 240 and one or more segments 246, augmented visualizations of planograms using one or more planograms 240 and product information 248, and issue reporting on a planogram using one or more planograms 240 and issues 250.

Visualization engine 212 of planogram planner 110 generates a customer-centric planogram based, at least in part, on customer segments 246 generated by segmentation engine 206 and planograms 240 generated by planogram creator 202 and/or category management system 204. Customer-centric planograms may comprise x-, y-, and z-coordinates depending on the number of displayed dimensions. Visualization engine 212 may map the coordinates and products on planogram 240 or on retail shelf image 402 to overlay information associated with a product over the product in the planogram or on the retail shelf. For example, visualization engine 212 may render or overlay graphics, colors, or text on planogram 240 or retail shelf image 402 to emphasize or de-emphasize products based, at least in part, on the chosen customer segment. For example, a customer segment may comprise customers who are allergic to nuts while another customer segment may comprise customers who are particularly price-sensitive. If visualization engine 212 generated customer-centric planograms based on these exemplary customer segments 246, the customer-centric planogram may comprise a visualization particular to the allergic customer (such as highlighting all non-allergic foods) and a visualization particular to the price-sensitive customer (such as highlighting all promotional or value-branded products).

Figure 5:
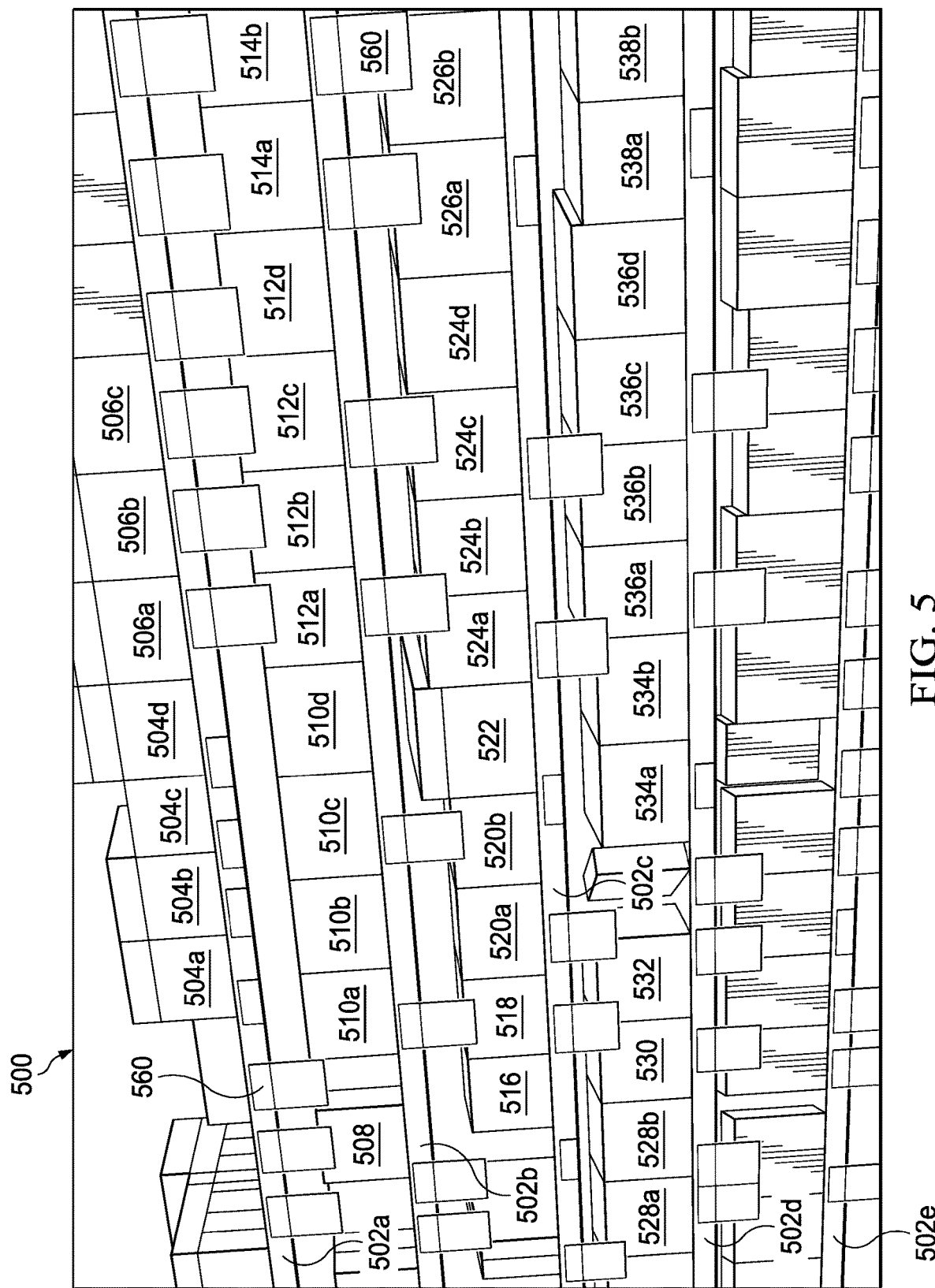
FIG. 5 illustrates a retail store shelving with various types of cereal snack bars.

FIG. 5 illustrates a retail store shelving 500 with various types of cereal snack bars. Retail store shelving 500 comprises five shelves 502a-502e having products 504a-538b and price tags 560. Products 504a-538b comprise first product 504a-504d, second product 506a-506c, third product 508, fourth product 510a-510d, fifth product 512a-512d, sixth product 514a-514b, seventh product 516, eighth product 518, ninth product 520a-520b, tenth product 522, eleventh product 524a-524d, twelfth product 526a-526b, thirteenth product 528a-528b, fourteenth product 530, fifteenth product 532, sixteenth product 534a-534b, seventeenth product 536a-536d, and eighteenth product 538a-538b. The products 504a-538b may be associated with a price which is displayed on price tags 560. According to the illustrated embodiment, products 504a-538b comprise cereal snack bars having different price points and ingredients that appeal to different customer segments.

Figure 6:
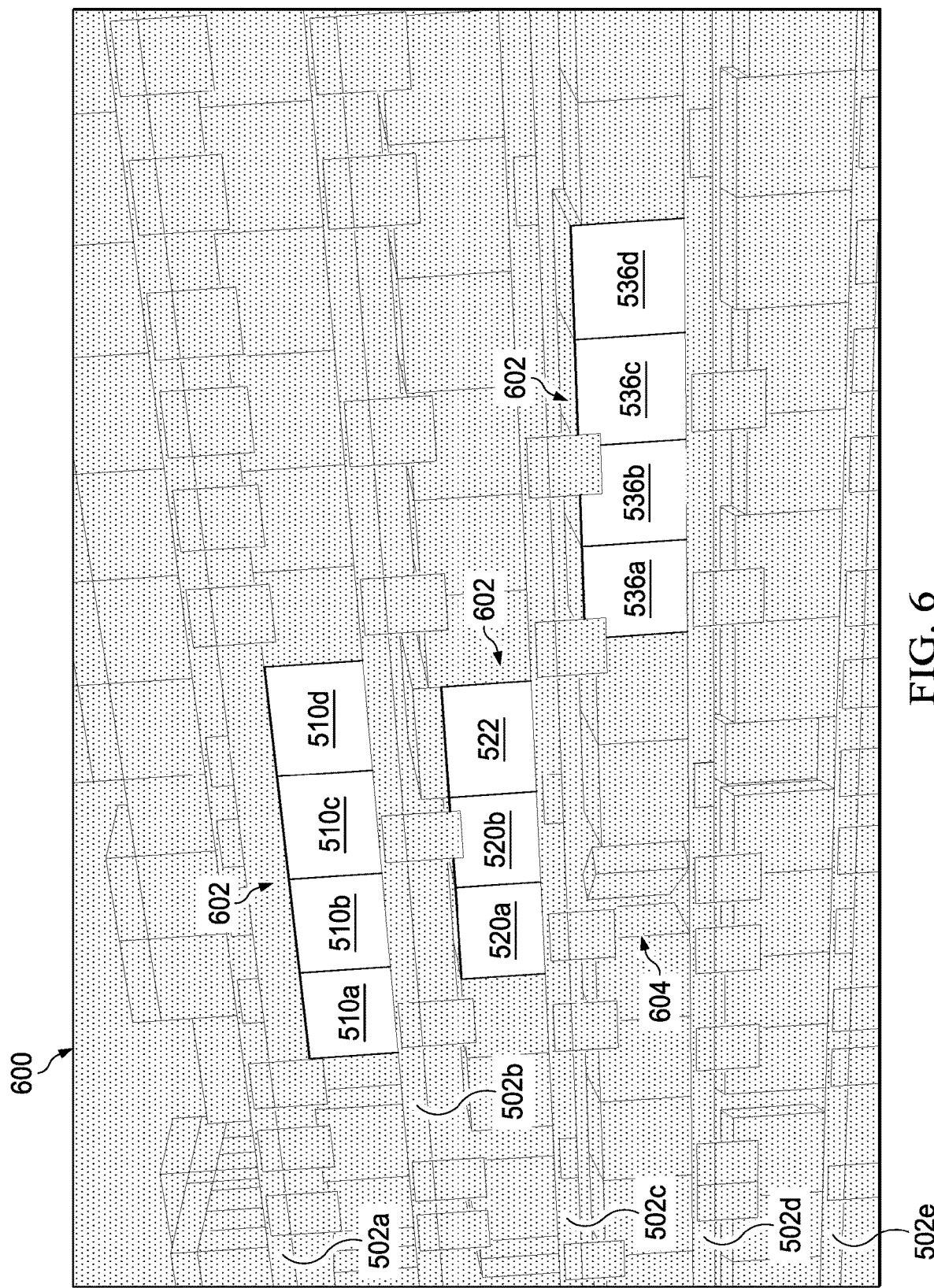
FIG. 6 illustrates the emphasizing and de-emphasizing of certain cereal snack bars from the retail store shelving of FIG. 5.

FIG. 6 illustrates the emphasizing and de-emphasizing of certain cereal snack bars from the retail store shelving 500 of FIG. 5. As described in more detail below, visualization engine 212 may generate a customer-centric planogram visualization 600 which displays products 504a-538b and may additionally highlight, grey out, or modify the appearance of products 504a-528b based on scores, product information, category management, customer segments, and the like. Visualization engine 212 may create a customer-centric planogram visualization 600 by altering the appearance of products 504a-538b to emphasize some products, and de-emphasize others.

The likelihood of a product appealing to a customer may be represented by rendering or overlaying graphics, colors, or text over an image of a planogram or retail shelf to illustrate the degree to which the product layout of the planogram or retail shelf would appeal to customers in particular customer segments 246. For example, products that do not appeal to a customer segment may be rendered or overlaid such that the products appear greyed out or otherwise obscured.

According to some embodiments, category management system 204 may use product appeal model 254 to calculate the likelihood that a product would appeal to customers belonging to a particular customer segment 246. For example, category management system 204 may compute a score for each product in a customer segment 246. By example only and not by way of limitation, the data may be collected based on the "yes" or "no" answers provided by a user for a product in a customer segment 246. Each product may receive a binary score of 0 or 1 that indicate to visualization engine 212 whether to highlight the product or grey the product out. For example, a value of 1 may be associated with a "yes" answer and may leave the product clear in the display, while a value of 0 may be associated with a "no" answer and may display that product in grey. Visualization engine 212 may also display a list of products that meet a particular score. According to embodiments, a score may be generated by machine learning model 256 that learns preferences based on historical data 262. Although binary scores of 0 or 1 are discussed, embodiments contemplate any score, including continuous scoring between 0 and 1, according to particular needs.

According to some embodiments, users may select different variations of what products are highlighted, greyed out, or otherwise visually altered. These variations on the decision to alter the display of a product (such as by greying the product out or highlighting the product, or other visual alterations) may rely on a combination of factors, such as, for example, whether a product appeals to a customer, whether a customer likes a particular brand or flavor, whether a customer is sensitive to price, and the like. For example, if a product displayed on a customer-centric planogram has a very low price, the product would likely not be greyed out for a highly price-sensitive customer, even if the customer is not known to particularly like the brand or flavor of the product.

In the illustrated example, visualization engine 212 generates a customer-centric planogram visualization 600 comprising emphasized products 602 and de-emphasized products 604. Continuing with this example, visualization engine 212 has greyed out the appearance of first product 504*a*-504*d*, second product 506*a*-506*c*, third product 508, fifth product 512*a*-512*d*, sixth product 514*a*-514*b*, seventh product 516, eighth product 518, eleventh product 524*a*-524*d*, twelfth product 526*a*-526*b*, thirteenth product 528*a*-528*b*, fourteenth product 530, fifteenth product 532, sixteenth product 534*a*-534*b*, and eighteenth product 538*a*-538*b*. Additionally, visualization engine 212 has not greyed out the appearance of fourth product 510*a*-510*d*, ninth product 520*a*-520*b*, tenth product 522, and seventeenth product 536*a*-536*d*. This may indicate, for example, that emphasized products 602 (comprising fourth product 510*a*-510*d*, ninth product 520*a*-520*b*, tenth product 522, and seventeenth product 536*a*-536*d*) appeal to a particular customer segment 246, while the de-emphasized products 604 (comprising the remaining greyed-out products) did not appeal to a particular customer segment 246. Continuing with the previous example where products 504*a*-538*b* comprise cereal snack bars with different prices and ingredients, the greying out of all products except for emphasized products 602 may indicate that these snack bars are highlighted because they are relevant to a particular customer segment 246, do not contain a particular allergen, or the like.

Figure 7:
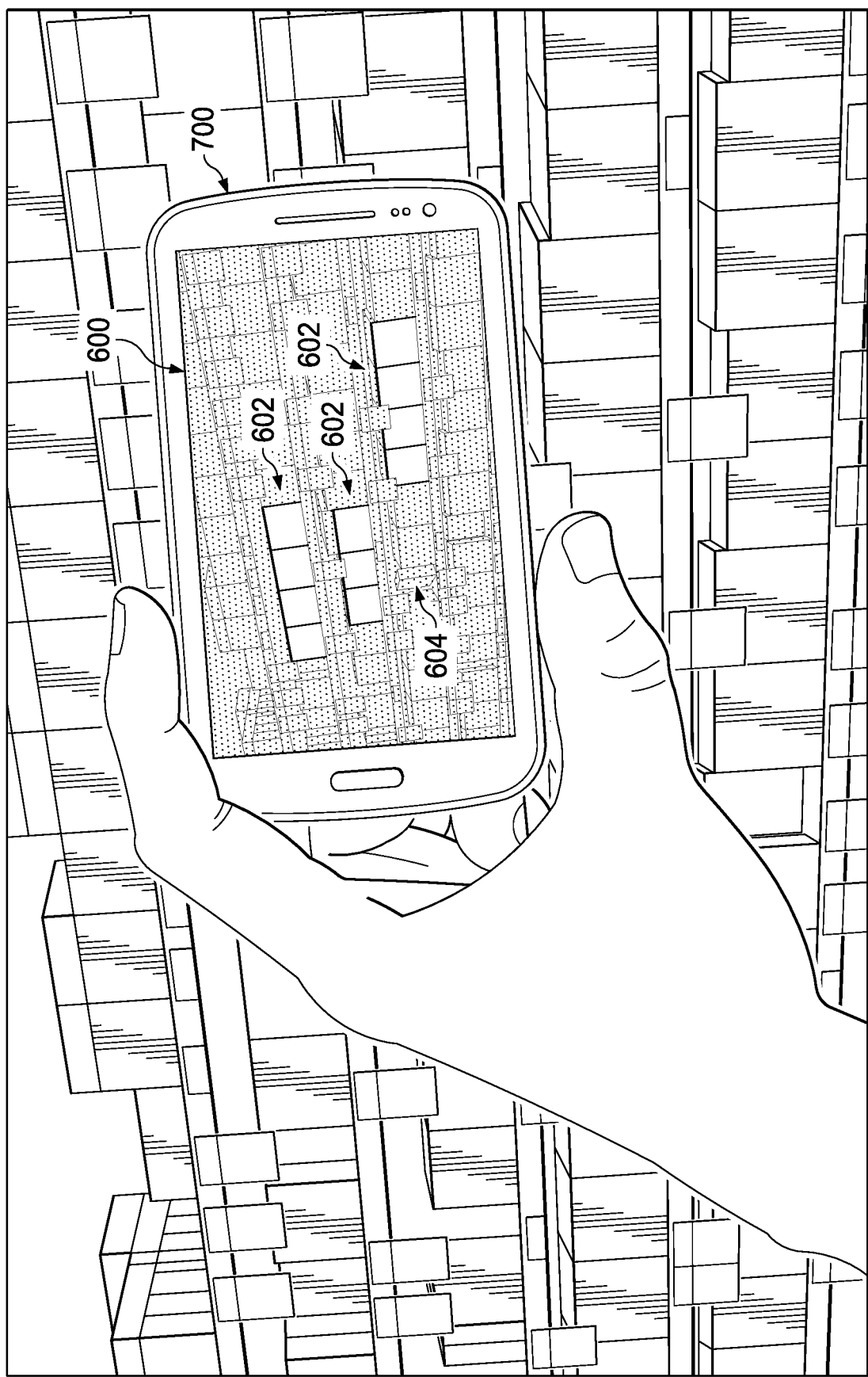
FIG. 7 illustrates a mobile device displaying a customer-centric planogram visualization, according to an embodiment.

FIG. 7 illustrates a mobile device 700 displaying customer-centric planogram visualization 600, according to an embodiment. As described herein, mobile device 700 may display customer-centric planogram visualization 600. A user may use mobile device 700 to view customer-centric planogram visualization 600 in a retail store location to make better purchasing decisions. Depending on the criteria chosen, mobile device 700 may display emphasized products 602 and de-emphasized products 604 to allow a user to quickly discriminate products in a retail store.

Additionally, planogram planners 110 may view customer-centric planogram visualization 600 to understand how customers from various customer segments 246 view a product layout in a retail store, including quickly noticing some products and completely ignoring others. To better understand how customers from different customer segments view product layouts, planogram planners 110 may view a customer-centric planogram visualization 600 in an actual retail setting using augmented reality.

Figure 8:
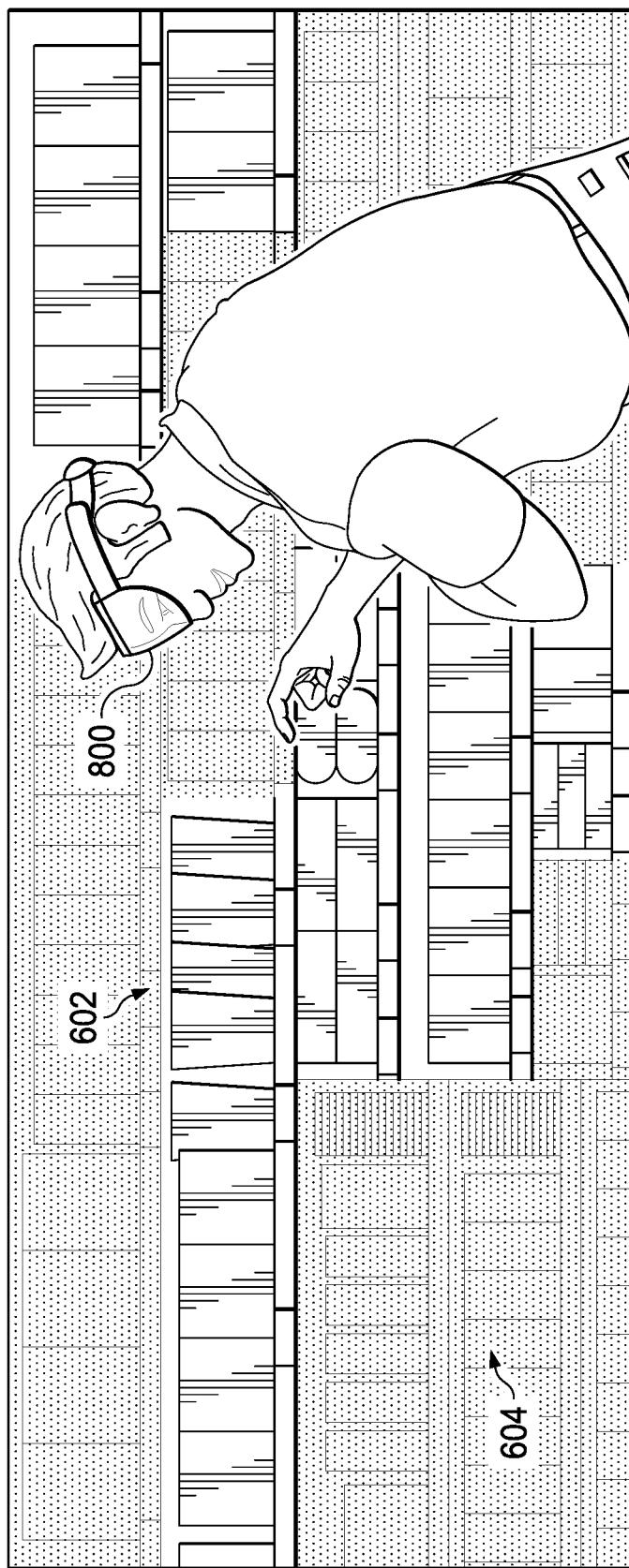
FIG. 8 illustrates augmented reality device displaying a customer-centric planogram visualization, according to an embodiment.

FIG. 8 illustrates augmented reality device 800 displaying customer-centric planogram visualization 600, according to an embodiment. According to embodiments, an augmented reality device is capable of displaying a substantially real-time video feed and renderings or overlays anchored to positions of objects displayed in the video feed so that the renderings or overlays appear to be linked or associated with real world objects. According to embodiments, augmented reality device 800 comprises an augmented-reality headset which displays augmented visualizations 404 received from visualization engine 212. Visualization engine 212 may map the location of products located in planogram 240 to shelf locations on retail shelf image 402 (such as, for example, a substantially real-time video feed of the real-world shelf space). Visualization engine 212 may then render a graphic-representation of planogram 240 on the video feed using the mappings so that the images of products of planogram 240 are displayed in substantially the location where physical products should be placed on the real-world shelf space to correctly execute the planogram.

In addition, or as an alternative, augmented reality device 800 may display augmented visualizations 404 received from visualization engine 212 comprising graphics, colors, and/or text representing one or more of instructions of instruction set 242, products highlighted or greyed-out to represent how the products are perceived by different customer segments 246, issues 250 displayed in association with the locations of the products or shelves where the issues 250 occur, and product information 248 displayed in association with the mapped locations of the products, including, for example, ingredients, allergy information, expiration date, brands, product category, associated customer segments, inventory levels, or any other information about the products.

According to embodiments, product information 248 may be visualized by visualization engine 212 on planogram 240 based, at least in part, on product information 248 from product information system 208 and planograms 240 generated by planogram creator 202 and/or category management system 204. Visualization engine 212 may render or overlay product information on planograms 240, which may enable a user to visualize information on planogram 240 that the user may not have consulted before. Further, rendered or overlaid product information 248 may provide for the user to avoid doing multiple back and forth runs between external data sources and planogram 240. Embodiments contemplate any suitable product information 248, including metadata, rendered or overlaid on planograms 240 or retail shelf images 402. As an example only and not by way of limitation, product information 248 may include any attribute-based information such as ingredients, brand, price, promotion, allergy information, and inventory availability. According to some embodiments, more than one type of product information 248 may be visualized simultaneously. For example, mission shoppers may have a specific mission such as buying a pasta dinner, making a pie, making a chicken dish, and may buy several ingredients together as a result. According to embodiments, visualization engine 212 ties these ingredients together by overlaying them on a master planogram that indicates location of the ingredients in the store, distance of the ingredients from the shopper, and the like.

According to embodiments, the visualization of the customer-centric planogram may depend on "share the shelf" information. In this situation, retailer 158 may, for example, contract with manufacturer 154, who provides products in a specific category. Continuing with this example, retailer 158 may guarantee manufacturer 154 a certain percentage of shelf space for the products received from manufacturer 154. If, for example, manufacturer 154 produces toilet paper, retailer 158 may guarantee a certain amount (e.g. 70%) of shelf space for products in the toilet paper category. According to embodiments, visualization engine 212 of planogram planner 110 may overlay a shelf space percentage organized by manufacturer and product showing the amount of shelf space allocated to particular manufacturers to more easily determine if the shelf space requirements are being met. In addition, or as an alternative, visualization engine 212 may grey out or highlight products from particular manufacturers to allow a user to more easily determine if shelf space requirements are met.

Visualization engine 212 of planogram planner 110 visualizes issue reporting on a planogram based, at least in part, on the issues 250 generated by issue reporting system 210 and planograms 240 generated by planogram creator 202 and/or category management system 204. According to embodiments, issue reporting system 210 collects issues 250 on products or sections of planograms 240 that were flagged by employees while executing those planograms 240 or generated automatically while monitoring planogram execution.

FIGS. 9A-9G illustrate execution of a cowboy hats promotion task 700 with issue reporting, according to an embodiment. According to embodiments, cowboy hats promotion task 700 is selected from a list of tasks and displayed for execution on one or more communication devices 130 at retail stores. As an example only and not by way of limitation, during execution, a user may flag an issue 250 when a problem prevents completing the execution, such as, for example, when the dimensions of a product in planogram 240 does not correspond to the actual size of the product. In the following example, a product comprising a hat is too tall to fit on the shelf indicated in planogram 240. The user may interact with issue reporting system 210 by reporting that the hat is too tall. Issue reporting system 210 identifies where and when issues occur and stores issues in issues database 226. Visualization engine 212 may then compile issues 250 and render or overlay illustrations of issues 250 on planogram 240 or retail shelf images 402, as described below.

Figure 9A:
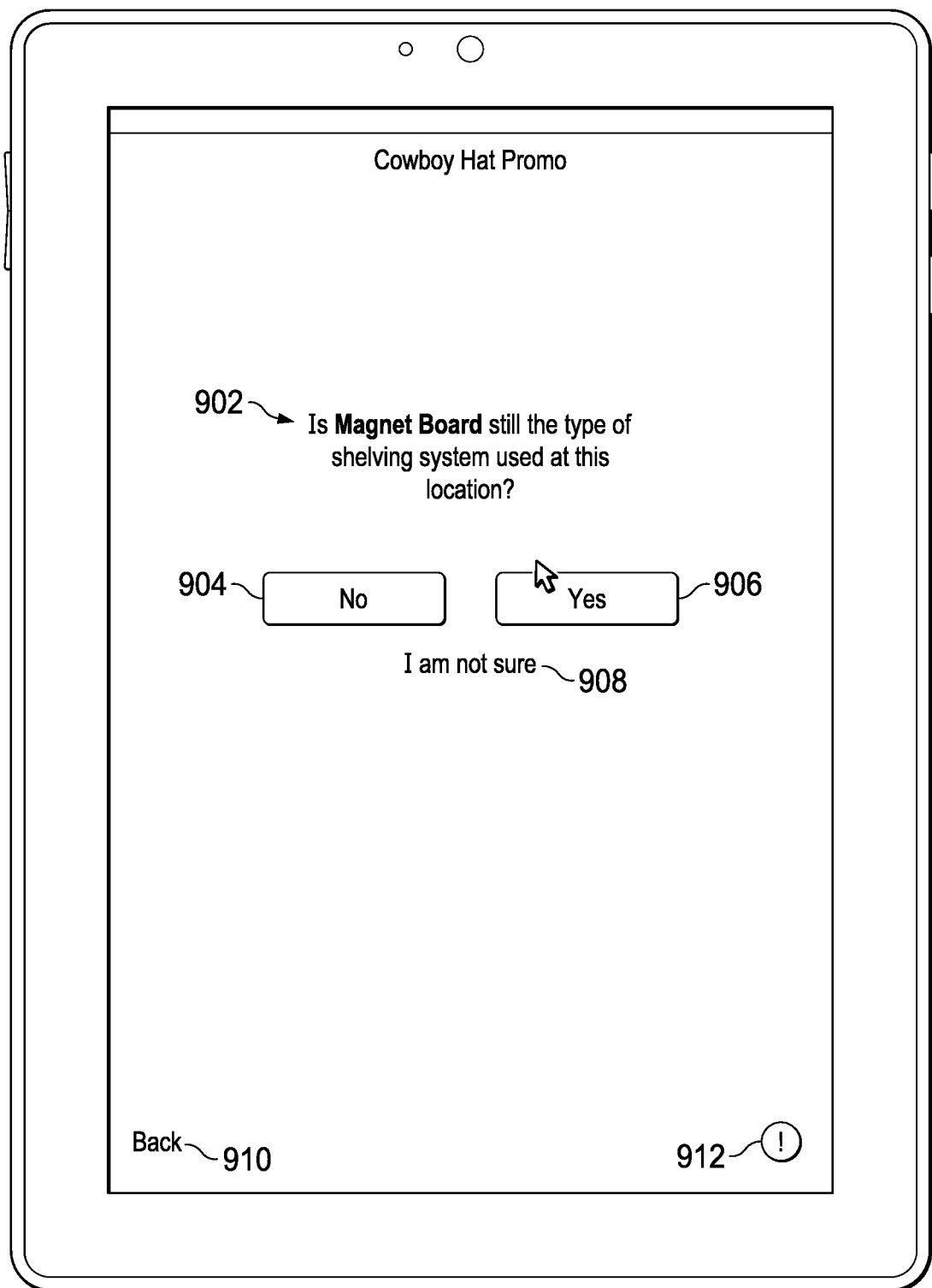
FIGS. 9A-9G illustrate execution of a cowboy hats promotion task with issue reporting, according to an embodiment.

FIG. 9A illustrates an exemplary shelving selection of cowboy hats promotion task 700, according to an embodiment. According to embodiments, cowboy hats promotion task 700 determines that a magnet board shelving system was previously used in the location of the cowboy hats promotion, and generates an inquiry 902 whether a magnet board shelving system is still being used in that location. One or more communication devices 130 executing the cowboy hats promotion task 700 may determine that a magnet board was previously used by consulting one or more databases, which indicates the type of shelving system selected during execution of a previous planogram 240, instruction set 242, and/or task 244. According to embodiments, one or more communication devices 130 display, in connection with inquiry 902, a negative option 904 and an affirmative option 906. In response to selecting affirmative option 906, one or more mobile devices 130 continues to a further action that presents a further instruction from instruction set 242 of the execution process of cowboy hats promotion task 700. Additionally, one or more communication devices 130 may display selectable text 908, which, when selected, initiates a process to identify whether a magnet board is still the current shelving system used in the location where cowboy hats promotion task 700 is to be completed. For example, in response a user selection of selectable text 908 (in the exemplary embodiment, labeled, "I am not sure.") execution process of cowboy hats promotion task 700 may present instructions or a description to provide the user with information to determine if a magnet board is still used as the shelving system. In response to a user selection of negative option 904, execution process of cowboy hats promotion task 700 may present an option to select the correct shelving system located where cowboy hats promotion task 700 is to be completed and/or transmit issue 250 to issue reporting system 210. In response to a user selection of back button 910, execution process of cowboy hats promotion task 700 may cause one or more communication devices 130 to return to a previous action in an instruction set 242. According to embodiments, one or more communication devices 130 comprises a task issue button 912 that, in response to a user selection, initiates a process for flagging issue 250 with the task 244, as described in more detail below.

Figure 9B:
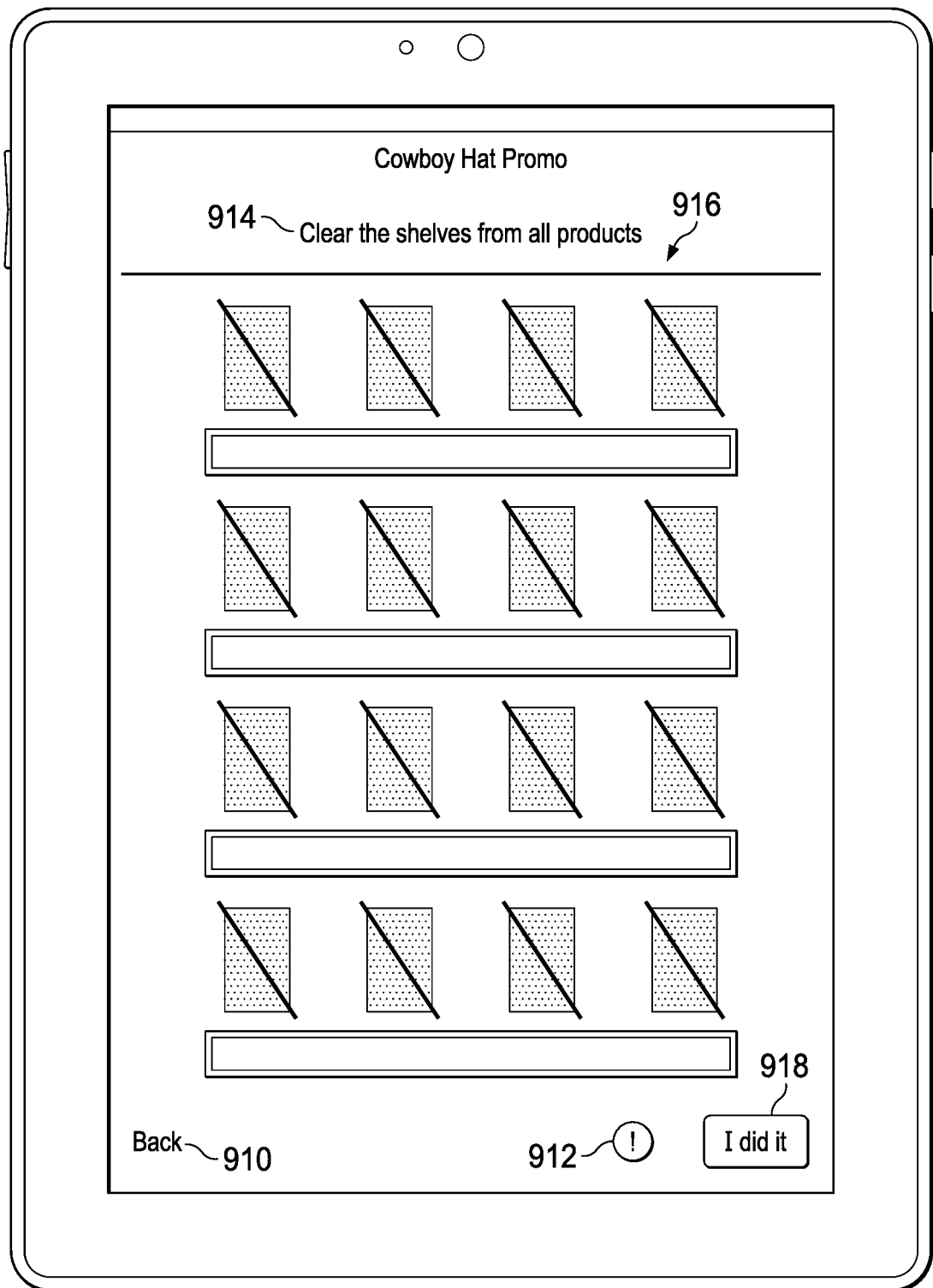

FIG. 9B illustrates instruction 914 and interactive planogram 240 of cowboy hats promotion task 700, according to an embodiment. As described above, execution process of cowboy hats promotion task may present instruction 914 and interactive planogram 916 that may show, not only product placement, but also the movement, removal, or addition of products on shelving that represents the current product layout and actual shelving system that is present at a retail store. For example, instruction 914 may indicate a description of the action displayed on interactive planogram 916.

Continuing with the cowboy hats promotion task 700 example, instruction 914 comprises an indication to remove all products from the shelves and interactive planogram 916 indicates product removal by graphics comprising gray boxes crossed by a strikethrough line. In response to an indication that all products are removed from the shelves, such as a user selecting advancement button 918, the execution process continues to a further action.

Figure 9C:
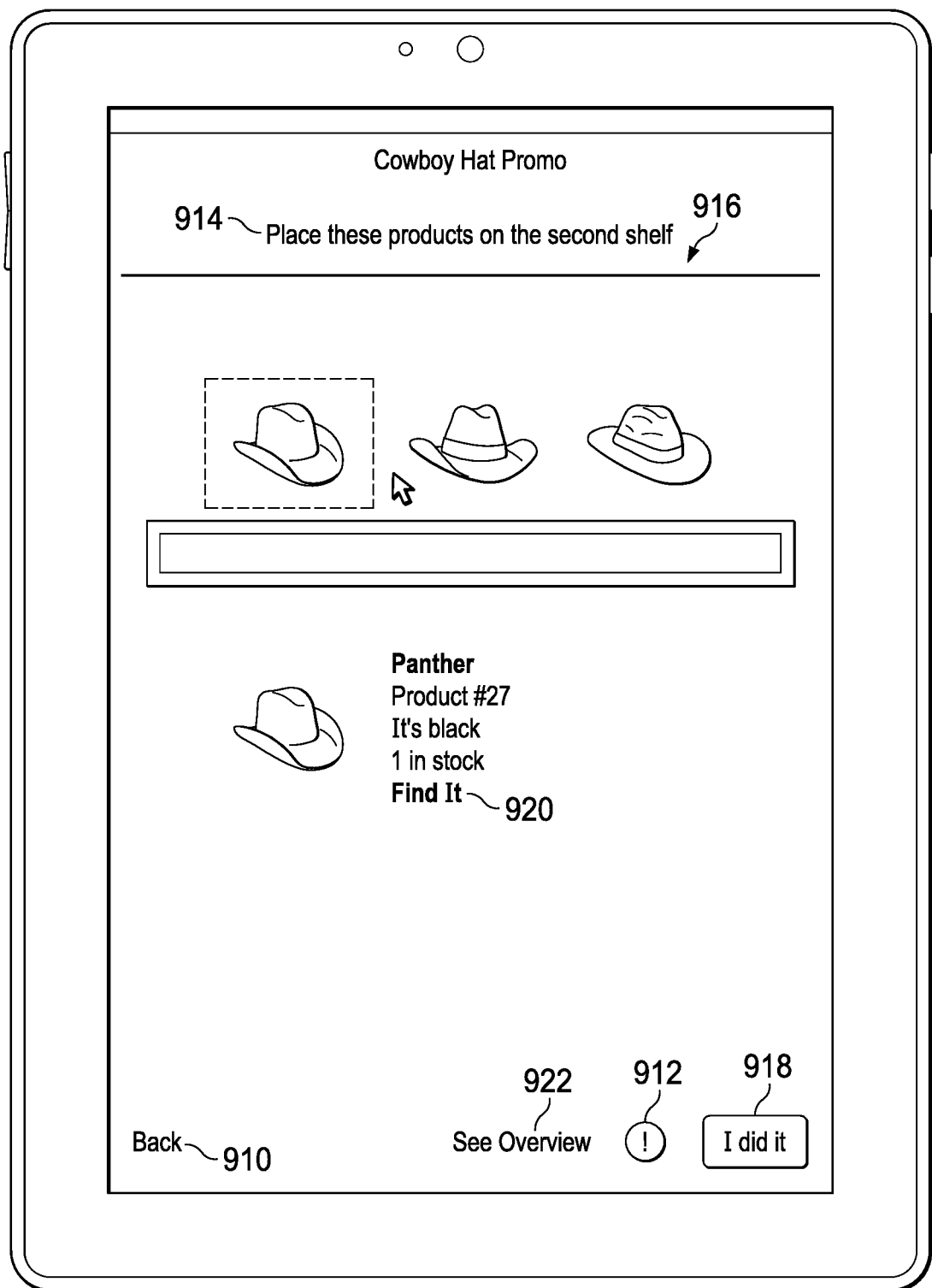

FIG. 9C illustrates instruction 914 and interactive planogram 916 of cowboy hats promotion task 700, according to an embodiment. Continuing with the exemplary cowboy hats promotion task 700, interactive planogram 916 represents a further action of the execution process. According to this action, instruction 914 dynamically updates to present instruction associated with the current action displayed on interactive planogram 916. According to the exemplary embodiments, instruction 914 directs a user to place an indicated product (indicated in the exemplary embodiment as a cowboy hat enclosed in a box) on a top shelf. Interactive planogram 916 graphically represents the product with an image and a description of the product. In the exemplary embodiments, the product is indicated as a cowboy hat and is associated with a product name, product description, the number of units in stock, and a selectable item location option 920 (labeled in the exemplary embodiment as, "Find it.") Selection of selectable item location option 920 may display further information to locate or identify the product illustrated. This may include, for example, generating one or more mappings, as described above, to, for example, locate an item to add to or remove from a shelf or an inventory of or shipment for one or more supply chain entities 150. In addition, or as an alternative, execution process of cowboy hats promotion task 700 causes one or more communication devices 130 to display product information 248 on one or more products in planogram 916, connect to inventory data to locate a product, determine if the product is in stock at a store, determine when the product may arrive at the store, and the like. In response to an indication that the indicated product is placed on the shelf, such as a user selecting advancement button 918, the execution process continues to a further action. According to embodiments, the execution process continues to dynamically update instruction 914 and interactive planogram 916 until all actions are completed or until execution process of cowboy hats promotion task 700 receives an indication that one or more actions of the execution process cannot be completed. In addition, or as an alternative, execution process of cowboy hats promotion task 700 displays on one on or more communication devices 130 overview selectable text 922 (labeled in the exemplary embodiment as "See overview"). In response to selection overview selectable text 922, execution process of cowboy hats promotion task 700 may present a final layout, including a planogram of the finalized shelf layout, of the current task. Additionally, the final layout may provide for selecting a product to determine more information about the selected product. By way of example and not by limitation, this may include selecting a product on the second shelf to initiate one or more communication devices 130 to display a zoomed-in view of the second shelf and/or allow user selection of a product to receive more information about the selected product.

Figure 9D:
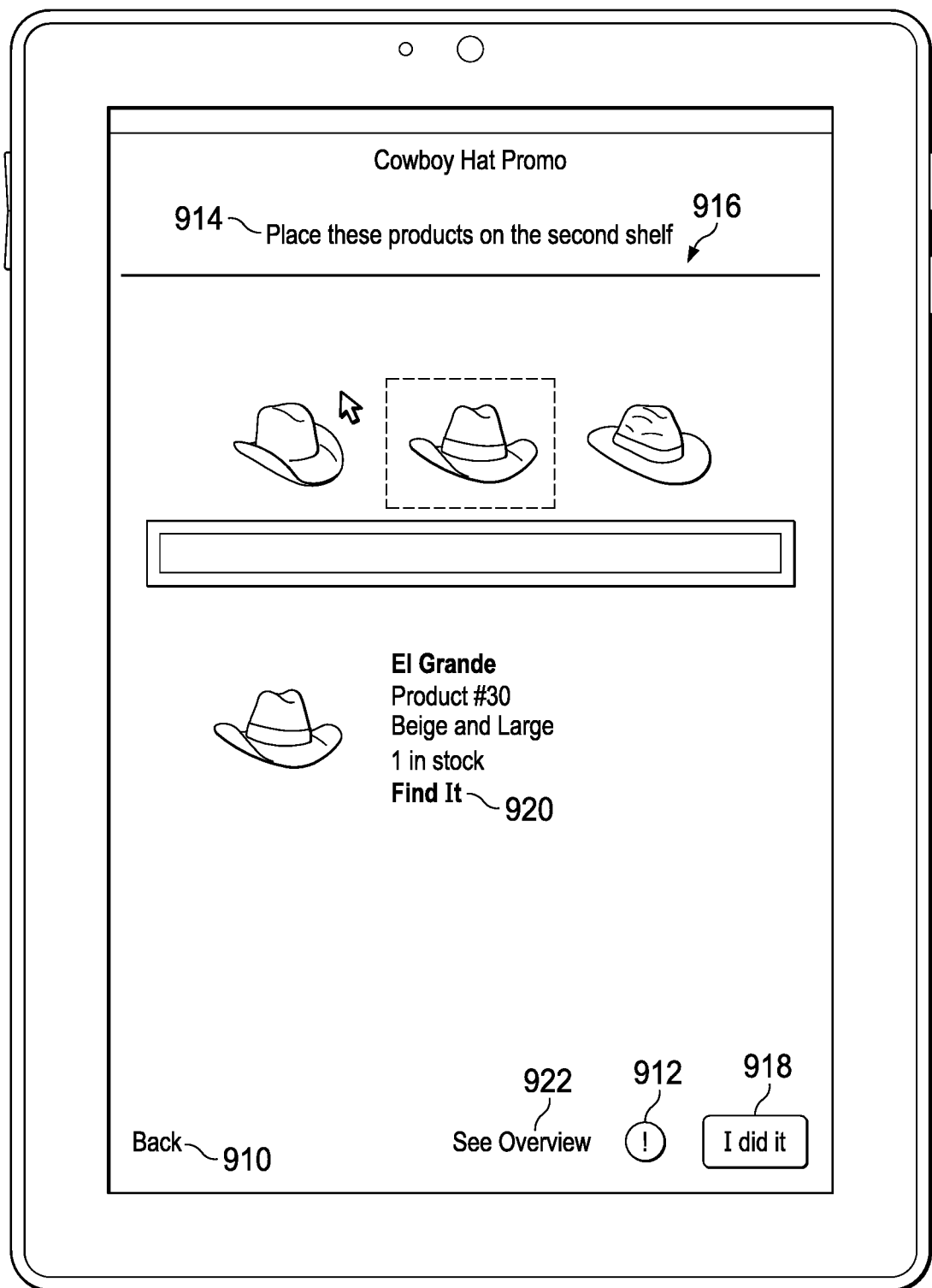

FIG. 9D illustrates a zoomed-in view of the second shelf of cowboy hats promotion task 700, according to an embodiment. As described above, in response to selection of a second shelf or a product on the second shelf of interactive planogram 916 or a final layout, execution process of cowboy hats promotion task 700 may display on one or more communication devices 130 a zoomed-in view of the second shelf of interactive planogram 916 or a product layout and display information associated with one or more products on the shelf. According to embodiments, execution process of cowboy hats promotion task 700 displays, in association with the zoomed-in view, instruction 914 which, in the exemplary embodiment, directs a user to place one or more indicated products on the second shelf. However, sometimes an issue 250 arises where a user is not able to continue with execution.

When an issue 250 arises during execution of planogram 240, instruction set 242, or task 244, a process may be initiated for flagging an issue 250 and/or resolving an issue 250. Such issues 250 may include, for example, a product being too large to fit on the shelving system located at s retail store. By way of explanation and not by limitation, continuing with the exemplary cowboy hats promotion task 700, execution of cowboy hats promotion task 700 may be halted if a product, such as a cowboy hat, is too tall for a shelf. In the exemplary embodiment, a user is instructed to place each of the displayed cowboy hats on the second shelf. As described above, this instruction 914 may be one of an instruction set 242. However, at this particular instruction 914, a user may need to flag an issue because the product does not fit. According to this embodiment, a process is initiated for flagging the issue of the cowboy hat being too large. This may include, for example, displaying on one or more communication devices 130 processes for reporting and/or resolving the issues 150.

Figure 9E:
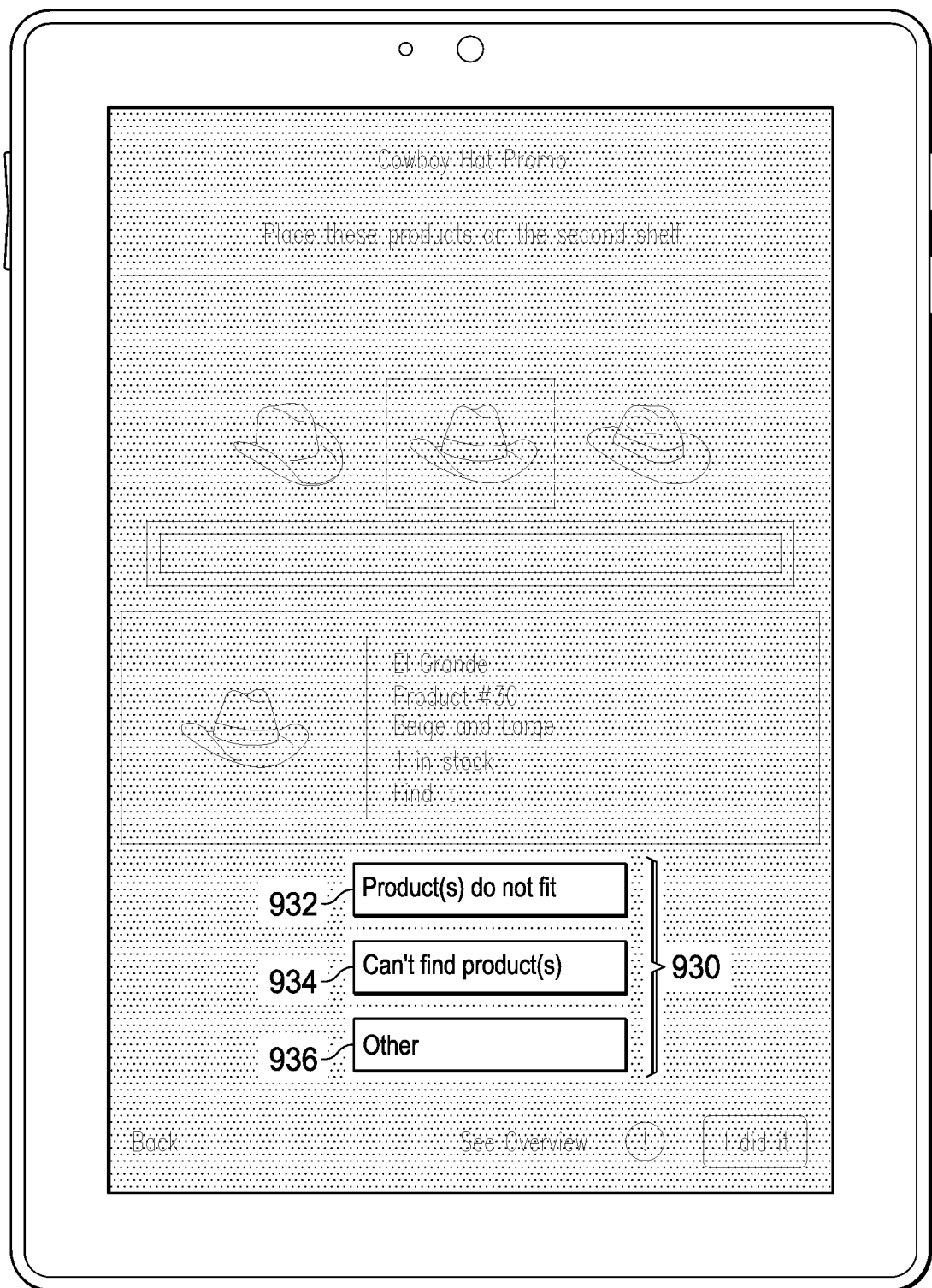

FIG. 9E illustrates an exemplary issue reporting interface 930 of cowboy hats promotion task 700, according to an embodiment. In response to a user indicating that an issue 250 has arisen during execution, execution process of cowboy hats promotion task 700 displays issue reporting interface 930. Issue reporting interface 930 may display options 932-936 to flag an issue 250 that arose during the execution of, for example, a planogram 240, instruction set 242, task 244, instruction, for one or more particular products.

Continuing with the exemplary cowboy hats promotion task 700 embodiment, issue reporting interface 930 automatically displays one or more issue options 932-936 over the current display. According to some embodiments, the current display surrounding issue options 932-936 is greyed out or obscured automatically. For the exemplary cowboy hats promotion task 700 embodiment, issue options 932-936 comprise first issue option 932 (labeled in the exemplary embodiment, "Product(s) do not fit"), second issue option 934 (labeled in the exemplary embodiment, "Can't find product(s)"), and third issue option 936 (labeled in the exemplary embodiment, "Other"). Although particular issue options 932-936 are described, embodiments contemplate any suitable issue options 932-936, according to particular needs.

Continuing with the exemplary embodiment of issue reporting interface 930, a user may select first issue option 932 ("Product(s) do not fit") because the cowboy hat that was supposed to be placed on the second shelf is too big to fit in the space.

According to some embodiments, in response to selection of one or more issue options 932-936 issue reporting system 210 records the selected issue option 932-936, creates issue 250, and uploads issue 250 to issue database 226. In addition, or as an alternative, issue reporting system 210 records the context in which the issue 250 was initiated including any associated planogram 240, instruction set 242, task 244, product, time, employee, and the like. According to embodiments, issue reporting system 210 opens a planogram 240 or instruction set 242 related to issue 250 to make error predictions. Error prediction may be based on, for example, historical data 262 or what is in the current view of a task. According to embodiments, if a user executing interactive planogram 916 initiates the creation of issue 250 at a particular action of an instruction set 242, while viewing a certain set of products, the error prediction will take into account this context and assume that there is a high probability that the issue 250 relates with what is being displayed or any other information that is specific to the set of information currently displayed.

As an example only and not by way of limitation, if issue 250 is received from a retail store, but the retail store is not the first retail store to have executed this planogram, issue reporting system 210 may have already corrected planogram 240, instruction set 242, task 244, and/or instruction 914, based, at least in part, on having received issue 250 (including, but not limited to, a ticket representing the same issue 250) from one or more other stores. For example, regarding the exemplary cowboy hats promotion task 700 and based on previously received issues 250, the selected cowboy hat may already have been flagged for the specific error of not fitting on the shelf. In response, issue reporting system 210 may automatically update planogram 240, instruction set 242, task 244, and/or instruction 914 with issue resolutions, including for example, an alternate product may be suggested to be placed in this space, planogram 240 may indicate placing the selected product in a different location, and/or other issue resolutions according to particular needs. According to some embodiments, issue reporting system 210 generates an alert to be displayed on one or more communication devices 130 to notify the user to the particular issue 250 prior to or contemporaneously with displaying an instruction 914 related to the product at issue.

Figure 9F:
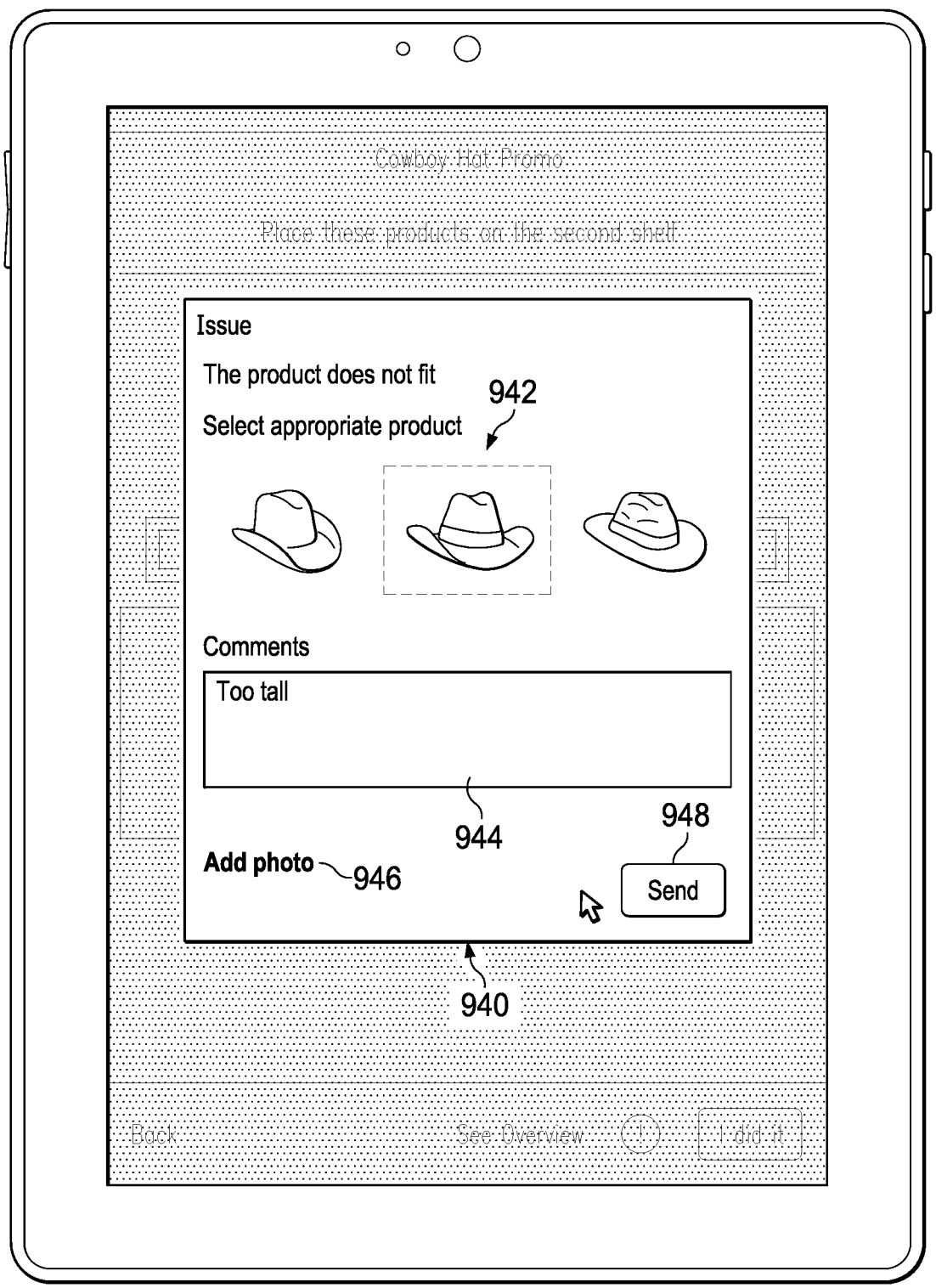

FIG. 9F illustrates an exemplary issue input sub-interface 940 of issue reporting interface 930 of cowboy hats promotion task 700, according to an embodiment. According to some embodiments, in response to the selection of issue options 932-936m execution process of cowboy hats promotion task 700 displays issue input sub-interface 940. Issue input sub-interface 940 may comprise product selector 942, text input box 944, photo upload selectable text 946, and issue send button 948. To further explain issue input sub-interface 940, an example is now given.

Continuing with the exemplary cowboy hats promotion task 700, in response to the selection of first issue option 932 ("The Product(s) does not fit"), execution process of cowboy hats promotion task 700 displays issue input sub-interface 940. For the exemplary example, issue input sub-interface 940 may automatically select the appropriate product in product selector 942, generate a comment in text input box 944, and/or initiate an image capture process using an image sensor 136 of one or more communication devices 130 based, at least in part, on the context in which the issue 250 arose. However, according to some embodiments, a user may select the product in product selector 942 with which the issue 250 arose (here, the middle cowboy hat) and may input text into text input box 944 to include additional information about the product associated with the issue 250. For example, regarding the cowboy hat of the exemplary example, a user may input "Too tall," into text input box 944 to describe the issue 250. Additionally, issue input sub-interface 940 provides for adding a picture of the issue ticket 250 sent to the retail headquarters. In response to selection of issue send button 948, the selected and/or inputted information (along with contextual information) may be sent to issue database 226 for access by retail headquarters or other retail stores. Additionally, as described above, because the process is interactive and the issue is flagged during execution, the context with which the issue 250 arose is automatically recorded by issue reporting system 210 and may include, for example, information associated with or identifying, for example, planogram 240, instruction set 242, task 244, instruction 650, product, the user, the retail store 404, the location (such as the particular shelving system, aisle, display, and the like), the time, and the like associated with the flagged issue. In addition, or as an alternative, in response to selection of issue send button 948, issue reporting system 210 may also determine if task 244 may be completed.

Figure 9G:
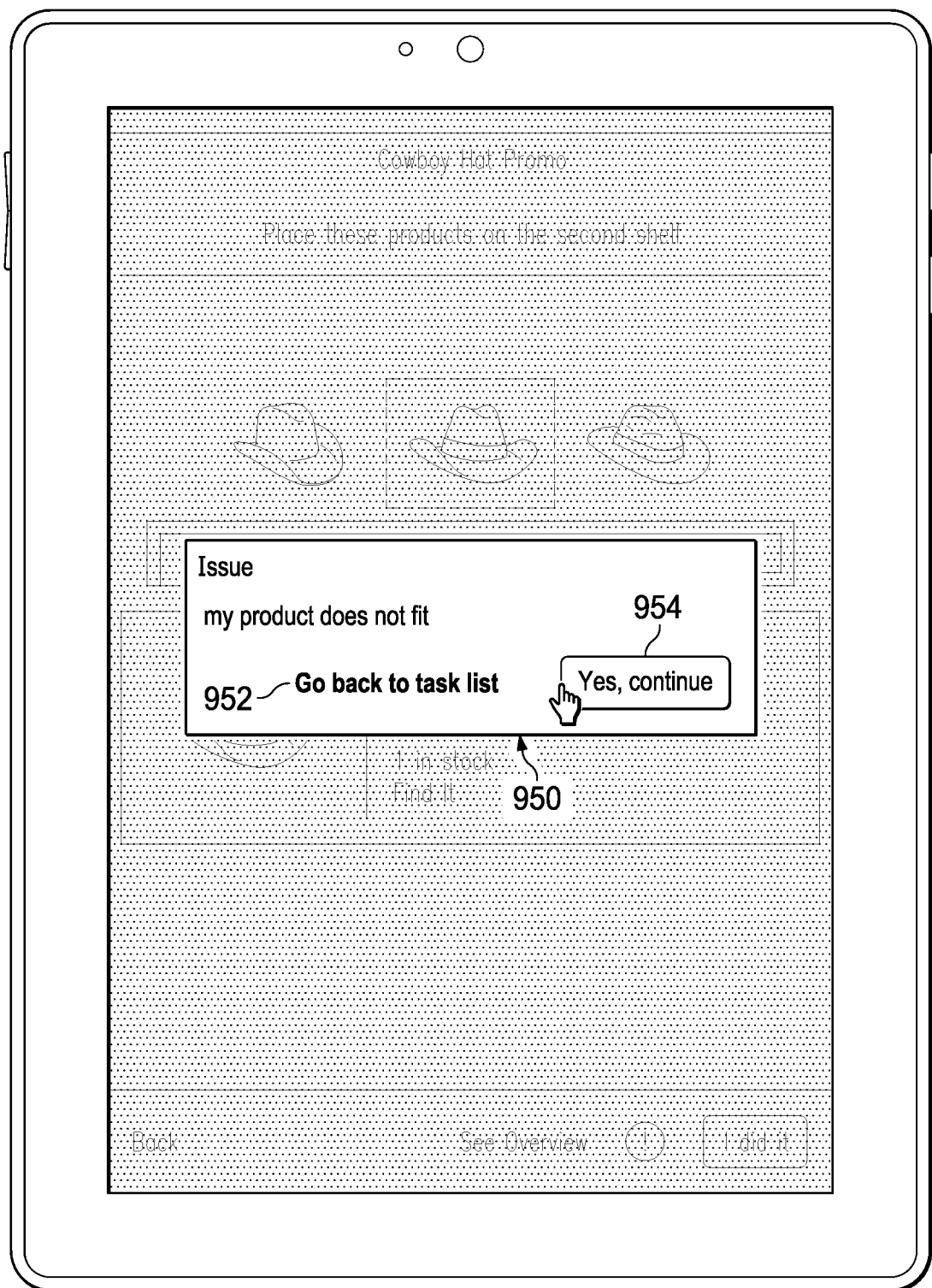

FIG. 9G illustrates a task completion inquiry 950 of issue reporting interface 930, according to an embodiment. As discussed above, in response to selection of issue send button 948, issue reporting interface 930 may, in addition or in the alternative of other actions described above, generate task completion inquiry 950. Task completion inquiry 950 dynamically displays on one or more communication devices 130 associated with flagging an issue 250 and provides selectable options for returning to a task overview by selecting task list selectable text and/or continuing to complete the current task by selecting task continue button.

After one or more issues 250 are received by issue reporting system 210, planogram planner 110 selects and communicates one or more planograms 240 and one or more issues 250 to visualization engine 212, which may then render or overlay graphics, colors, and text to, among other things, illustrate the locations on planogram 240 (including, shelf locations or products) where issues 250 are occurring.

Figure 10:
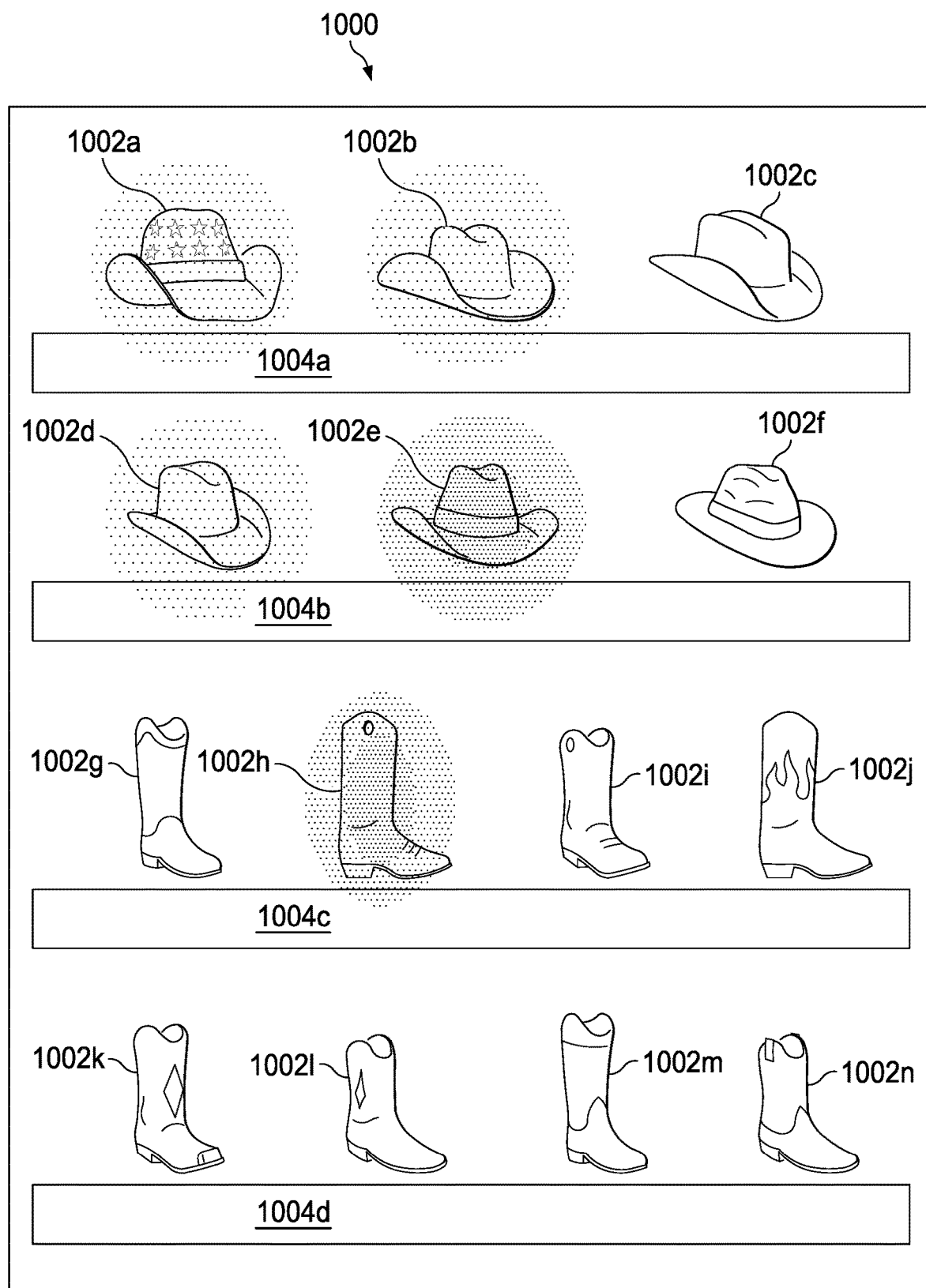
FIG. 10 illustrates issue reporting on a planogram comprising a heat map, according to an embodiment.

FIG. 10 illustrates issue reporting on a planogram comprising heat map 1000, according to an embodiment. In one embodiment, visualization engine 212 overlays or renders a heat map 1000 on planogram 240 or a retail shelf space. According to embodiments, heat map 1000 comprises one or more products 1002a-1002n arranged on shelves 10004a-1004d. According to embodiments, heat map 1000 comprises colored shading overlaid or rendered on planogram 240 where the color of the shading indicates the frequency of issues 250 occurring at the shaded locations. Areas where the shading is darkest indicate locations where issues 250 occur most frequently, while areas where the shading is lighter indicates areas where issues 250 occur less frequently. For example, continuing with the example described above, planogram 240 is shaded darkest over product 1002e (the exemplary cowboy hat described above as, "too tall") on shelf 1004b (the second shelf). Additionally, lighter colored shading of heat map 1000 (such as that associated with product 1002h (a cowboy boot)) represent errors that occur less frequently than the more darkly colored portions. Based on the exemplary heat map 1000, retail headquarters may quickly identify a large amount of issues 250 occurring during execution of the cowboy hats promotion task 700 with product 1002e.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for augmented visualization of a planogram of one or more supply chain entities, comprising:
  creating, by a computer, a planogram comprising an initial product arrangement comprising one or more products, each of the one or more products associated with a planogram location;
  retrieving, by the computer, an image of the planogram and a substantially real-time video feed of one or more shelf locations;
  mapping, by the computer, a location of the one or more products from the planogram to the one or more shelf locations;
  rendering for a particular user, by the computer, a real-time augmented visualization comprising displaying the image of the planogram at one or more coordinates for a particular shelf location, wherein images of the one or more products of the planogram are displayed in substantially a location where the one or more products should be placed to correctly execute the planogram and wherein one or more images of the one or more products of the planogram are highlighted or greyed-out to represent how the one or more products of the planogram are perceived by different customer segments; and
  displaying, on the particular user's mobile device, the real-time augmented visualization of the planogram.

2. The computer-implemented method for augmented visualization of a planogram of one or more supply chain entities of claim 1, wherein the real-time augmented visualization further comprises overlaying one or more of graphics, colors and text on the image of the planogram to display one or more issues displayed in association with one or more products or shelves where the one or more issues occur.

3. The computer-implemented method for augmented visualization of a planogram of one or more supply chain entities of claim 2, wherein the real-time augmented visualization further comprises planogram issue reporting of collected issues on one or more products or one or more sections of the planogram.

4. The computer-implemented method for augmented visualization of a planogram of one or more supply chain entities of claim 3, wherein the collected issues on the one or more products or the one or more sections of the planogram are flagged by employees or generated automatically.

5. The computer-implemented method for augmented visualization of a planogram of one or more supply chain entities of claim 1, wherein the real-time augmented visualization further comprises overlaying one or more of graphics, colors, and text over the image of the planogram to display product information in association with the one or more mapped locations of the one or more products.

6. The computer-implemented method for augmented visualization of a planogram of one or more supply chain entities of claim 1, wherein the real-time augmented visualization further comprises overlaying a shelf space percentage organized by manufacturer and product to determine if shelf space requirements are being met.

7. The computer-implemented method for augmented visualization of a planogram of one or more supply chain entities of claim 1, wherein the real-time augmented visualization further comprises greying out or highlighting products from particular manufacturers to determine if shelf space requirements are being met.

8. A system for augmented visualization of a planogram of one or more supply chain entities, comprising:
a computer comprising a processor and a memory and configured to:
create a planogram comprising an initial product arrangement comprising one or more products, each of the one or more products associated with a planogram location;
retrieve an image of the planogram and a substantially real-time video feed of one or more shelf locations;
map a location of the one or more products from the planogram to the one or more shelf locations;
render for a particular user a real-time augmented visualization comprising displaying the image of the planogram at one or more coordinates for a particular shelf location, wherein images of the one or more products of the planogram are displayed in substantially a location where the one or more products should be placed to correctly execute the planogram and wherein one or more images of the one or more products of the planogram are highlighted or greyed-out to represent how the one or more products of the planogram are perceived by different customer segments; and
display, on the particular user's mobile device, the real-time augmented visualization of the planogram.

9. The system of claim 8, wherein the real-time augmented visualization further comprises overlaying one or more of graphics, colors and text on the image of the planogram to display one or more issues displayed in association with one or more products or shelves where the one or more issues occur.

10. The system of claim 9, wherein the real-time augmented visualization further comprises planogram issue reporting of collected issues on one or more products or one or more sections of the planogram.

11. The system of claim 10, wherein the collected issues on the one or more products or the one or more sections of the planogram are flagged by employees or generated automatically.

12. The system of claim 8, wherein the real-time augmented visualization further comprises overlaying one or more of graphics, colors, and text over the image of the planogram to display product information in association with the one or more mapped locations of the one or more products.

13. The system of claim 8, wherein the real-time augmented visualization further comprises overlaying a shelf space percentage organized by manufacturer and product to determine if shelf space requirements are being met.

14. The system of claim 8, wherein the real-time augmented visualization further comprises greying out or highlighting products from particular manufacturers to determine if shelf space requirements are being met.

15. A non-transitory computer-readable medium embodied with software, the software when executed configured to provide for augmented visualization of a planogram of one or more supply chain entities by:
creating a planogram comprising an initial product arrangement comprising one or more products, each of the one or more products associated with a planogram location;
retrieving an image of the planogram and a substantially real-time video feed of one or more shelf locations;
mapping a location of the one or more products from the planogram to the one or more shelf locations;
rendering for a particular user a real-time augmented visualization comprising displaying the image of the planogram at one or more coordinates for a particular shelf location, wherein images of the one or more products of the planogram are displayed in substantially a location where the one or more products should be placed to correctly execute the planogram and wherein one or more images of the one or more products of the planogram are highlighted or greyed-out to represent how the one or more products of the planogram are perceived by different customer segments; and
displaying, on the particular user's mobile device, the real-time augmented visualization of the planogram.

16. The non-transitory computer-readable medium of claim 15, wherein the real-time augmented visualization further comprises overlaying one or more of graphics, colors and text on the image of the planogram to display one or more issues displayed in association with one or more products or shelves where the one or more issues occur.

17. The non-transitory computer-readable medium of claim 16, wherein the real-time augmented visualization further comprises planogram issue reporting of collected issues on one or more products or one or more sections of the planogram.

18. The non-transitory computer-readable medium of claim 17, wherein the collected issues on the one or more products or the one or more sections of the planogram are flagged by employees or generated automatically.

19. The non-transitory computer-readable medium of claim 15, wherein the real-time augmented visualization further comprises overlaying one or more of graphics, colors, and text over the image of the planogram to display product information in association with the one or more mapped locations of the one or more products.

20. The non-transitory computer-readable medium of claim 19, wherein the real-time augmented visualization further comprises overlaying a shelf space percentage organized by manufacturer and product to determine if shelf space requirements are being met.

* * * * *